United States Patent
Powell et al.

(10) Patent No.: US 9,577,413 B1
(45) Date of Patent: Feb. 21, 2017

(54) CABLE GUIDE ACTUATION APPARATUS

(71) Applicants: Steve Powell, Lee's Summit, MO (US); Jamie Allen Ferguson, Agency, MO (US); Steve Kulcsar, Lee's Summit, MO (US)

(72) Inventors: Steve Powell, Lee's Summit, MO (US); Jamie Allen Ferguson, Agency, MO (US); Steve Kulcsar, Lee's Summit, MO (US)

( * ) Notice: Subject to any disclaimer, the term of this patent is extended or adjusted under 35 U.S.C. 154(b) by 0 days.

(21) Appl. No.: 15/050,001

(22) Filed: Feb. 22, 2016

Related U.S. Application Data

(63) Continuation-in-part of application No. 14/855,555, filed on Sep. 16, 2015.

(51) Int. Cl.
*H02G 1/02* (2006.01)
*H02G 1/04* (2006.01)

(52) U.S. Cl.
CPC .................................. *H02G 1/04* (2013.01)

(58) Field of Classification Search
CPC .............. H02G 1/02; H02G 1/04; H02G 1/06; H02G 1/08; H02G 3/04; B65H 57/14
See application file for complete search history.

(56) References Cited

U.S. PATENT DOCUMENTS

| | | |
|---|---|---|
| 3,145,973 A | 8/1964 | MacFarlane |
| 4,420,143 A | 12/1983 | Harris |
| 5,941,507 A | 8/1999 | Page |

*Primary Examiner* — Monica Carter
*Assistant Examiner* — Nirvana Deonauth
(74) *Attorney, Agent, or Firm* — Dale J. Ream

(57) ABSTRACT

A cable guide actuator apparatus is disclosed for guiding a conductor cable onto a wheel assembly, the actuator apparatus including a framework operatively coupled to the wheel assembly. A pair of roller assemblies is pivotally coupled to respective ends of the framework, each having a roller member capable of maintaining the conductor cable in the groove of the wheel assembly. Each roller assembly is pivotally movable between a deployed configuration at which roller members are adjacent the groove and a released configuration at displaced from the groove. A locking assembly extends between the pair of roller assemblies and is selectively movable between a locked configuration that maintains the pair of roller assemblies at the deployed configuration and an unlocked configuration that allows movement to the released configuration. The roller assemblies are biased toward the released configuration when the locking assembly is unlocked. The locking assembly may be unlocked remotely.

20 Claims, 33 Drawing Sheets

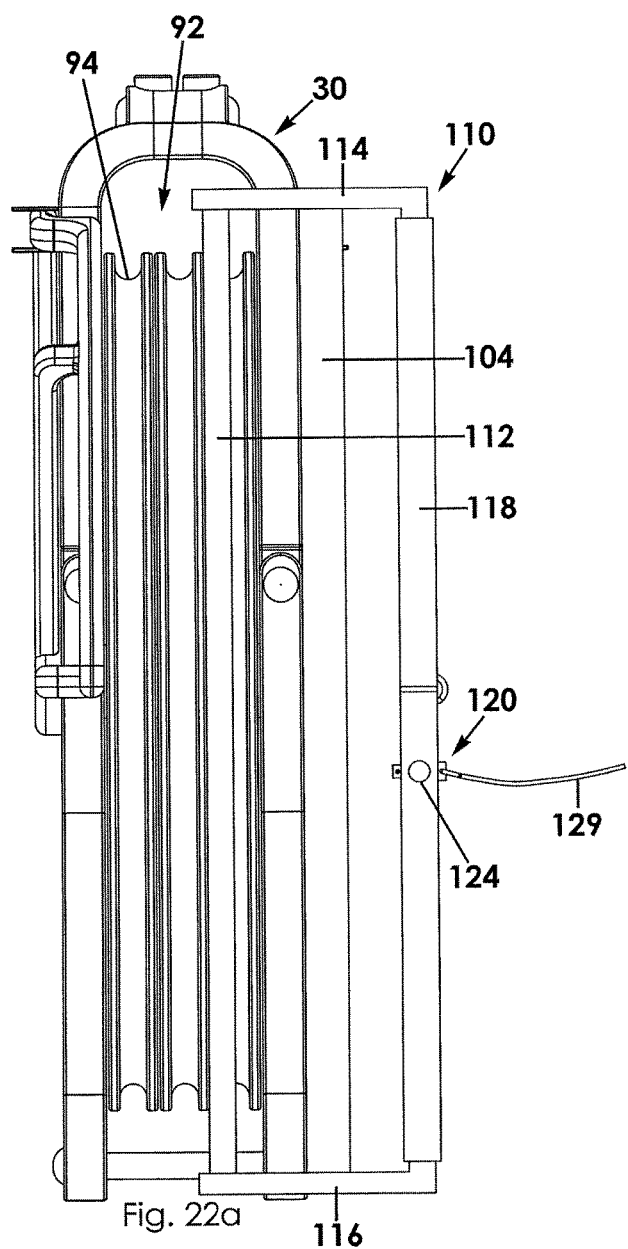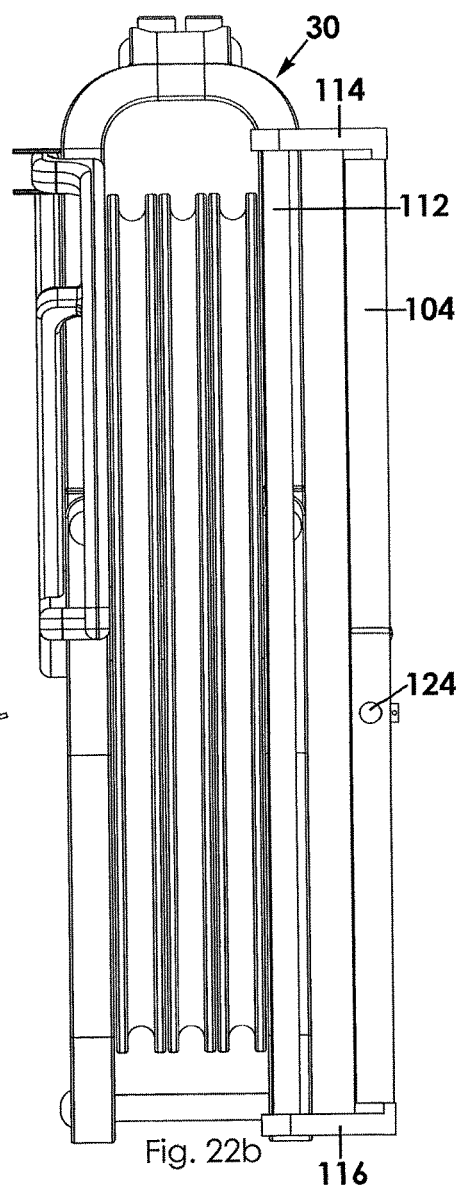

CABLE GUIDE ACTUATION APPARATUS

REFERENCE TO RELATED APPLICATIONS

This application claims the benefit of nonprovisional patent application U.S. Ser. No. 14/855,555 filed Sep. 16, 2015 titled Stringer Wheel and Cable Guide Apparatus and which is incorporated herein by reference.

BACKGROUND OF THE INVENTION

This invention relates generally to cable stringing equipment and, more particularly, to a stringer wheel and cable guide apparatus for maintaining a conductor cable, a communication line, or the like securely nested in the groove of a stringer wheel during stringing, especially when the cable is previously or subsequently at an angle relative to the stringer wheel.

Aerial cables are installed in many above ground applications, such as electrical conductive wires extending between poles or towers, telephone lines extending between telephone poles, fiber optic cables for data communications, and the like. Miles of these cables are typically installed by using motorized puller that pulling the wires from a spool through a series of stringer wheels to their eventual position atop spaced apart poles or towers. Each stringer wheel, also referred to as a pulley or stringer block, may define a groove or channel into which the cable is nested in order not to fall out and control over its alignment and direction.

Although the cables may extend for miles in generally linear arrangements such that a loss of cable alignment in the groove is unlikely, there are occasions when mild to sharp angles or turns are needed. The pulling of a cable at an angle to the stringing wheel increases the risk that the cable will jump out of the groove and completely lose contact with the stringer wheel—a condition that may require the entire pulling operation to pause while human effort is expended to physically realign the cable. In fact, a human line worker may have to be positioned at the location of the angled line to manually hold the cable in place—sometimes by use of a bucket lift or by climbing a tower.

Another troublesome issue experienced in aerial cabling is that roller assemblies properly positioned to maintain a cable in position in the groove of a wheel assembly may need to be intentionally moved or displaced from adjacent the wheel assembly so that a running board pulling multiple cables may pass across the wheel assembly without obstruction. In other words, the roller assemblies need to be temporarily or permanently pivoted out of the way so that a cabling operation can continue. Typically, movement of the roller assemblies has required a human to be hoisted into the air and manually actuate this movement—an event that can be dangerous, takes an inefficient and undesirable amount of time, and may result in damage to the stringing equipment.

Therefore, it would be desirable to have a cable guide actuator apparatus that enables one or more roller assemblies (configured to hold cables in the groove of a wheel assembly even during angular pulls) to be temporarily or permanently pivotally displaced from an immediate proximity to the wheel assembly so that a running board pulling additional cables over the wheel assembly is not obstructed. Further, it would be desirable to have a cable guide actuator apparatus that is capable of being remotely actuated so that a human operator is not needed to move the roller assemblies. In addition, it would be desirable to have a cable guide actuator apparatus that is biased to move to a released configuration immediately and automatically upon release of a locking assembly.

SUMMARY OF THE INVENTION

A stringer wheel and cable guide apparatus according to the present invention includes a wheel assembly having a hub and a plurality of spokes extending radially outwardly from the hub, the wheel assembly having a rim coupled to distal ends of the plurality of spokes that equally displace the rim from the hub and so as to be rotatably coupled to the hub. The rim includes an outer face defining a groove configured to receive the conductor cable in a nested arrangement as the cable is strung and tensioned. The stringer wheel and cable guide apparatus includes a guide assembly having a framework operatively coupled to the hub of the wheel assembly, the guide assembly having a pair of roller members rotatably coupled to the framework. Each roller member has an elongate and generally cylindrical configuration situated adjacent the groove of the outer face of the rim and configured to maintain the conductor cable in the groove.

In another aspect of the invention, a cable guide actuator apparatus is disclosed for guiding a conductor cable into a groove defined by an outer face of a wheel assembly, the actuator apparatus including a guide assembly that includes a framework operatively coupled to the wheel assembly and having opposed front and rear ends. A pair of roller assemblies is pivotally coupled to the front and the rear ends of the framework, respectively, each roller assembly having a roller member forming a roller surface capable of maintaining the conductor cable in the groove of the wheel assembly. The pair of roller assemblies is pivotally movable between a deployed configuration at which the pair of roller members is adjacent the groove and a released configuration at which the pair of roller members is displaced from the groove. A locking assembly extends between the pair of roller assemblies and is selectively movable between a locked configuration that maintains the pair of roller assemblies at the deployed configuration and an unlocked configuration that allows the pair of roller assemblies to move to the released configuration. The roller assemblies are biased toward the released configuration when the locking assembly is unlocked. The locking assembly may be unlocked remotely.

Therefore, a general object of this invention is to provide a cable guide actuator apparatus that enables one or more roller assemblies to be selectively moved from a deployed position guiding a cable onto a stringer wheel to a released position displaced from the groove of the wheel.

Another object of this invention is to provide a cable guide apparatus, as aforesaid, which includes a locking assembly that holds the roller assemblies in a deployed configuration adjacent the wheel surface so as to maintain a cable therein.

Still another object of this invention is to provide a cable guide actuator apparatus, as aforesaid, having means for releasing or unlocking the locking assembly so that the roller assemblies are free to move to a displaced configuration that does not obstruct a path onto the wheel assembly.

Yet another object of this invention is to provide a cable guide actuator apparatus, as aforesaid, which includes a means for automatically moving the roller assemblies to the released configuration when the locking assembly is unlocked or released.

A further object of this invention is to provide a cable guide actuator apparatus, as aforesaid, in which the locking assembly may be released or unlocked from a place remote from the cable guide wheel and assembly itself.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 22a is an end view of the cable guide actuator apparatus as in FIG. 16;

FIG. 22b is an end view of the cable guide actuator apparatus as in FIG. 18;

DESCRIPTION OF THE PREFERRED EMBODIMENT

A stringer wheel and cable guide apparatus for use in stringing electrical conductor cable and other communication lines according to a preferred embodiment of the present invention will now be described in detail with reference to FIGS. 1 to 33 of the accompanying drawings. The stringer wheel and cable guide apparatus 10 includes a wheel assembly 20 configured to receive a cable as it is being strung or tensioned and a guide assembly 50 immediately adjacent the wheel assembly 20 configured to make sure the cable does not become misaligned or dislodged from its intended position relative to the wheel assembly 20—especially when the cable is being strung at an angle between a plurality of stringer wheels or otherwise not in a linear arrangement.

Figure 3:
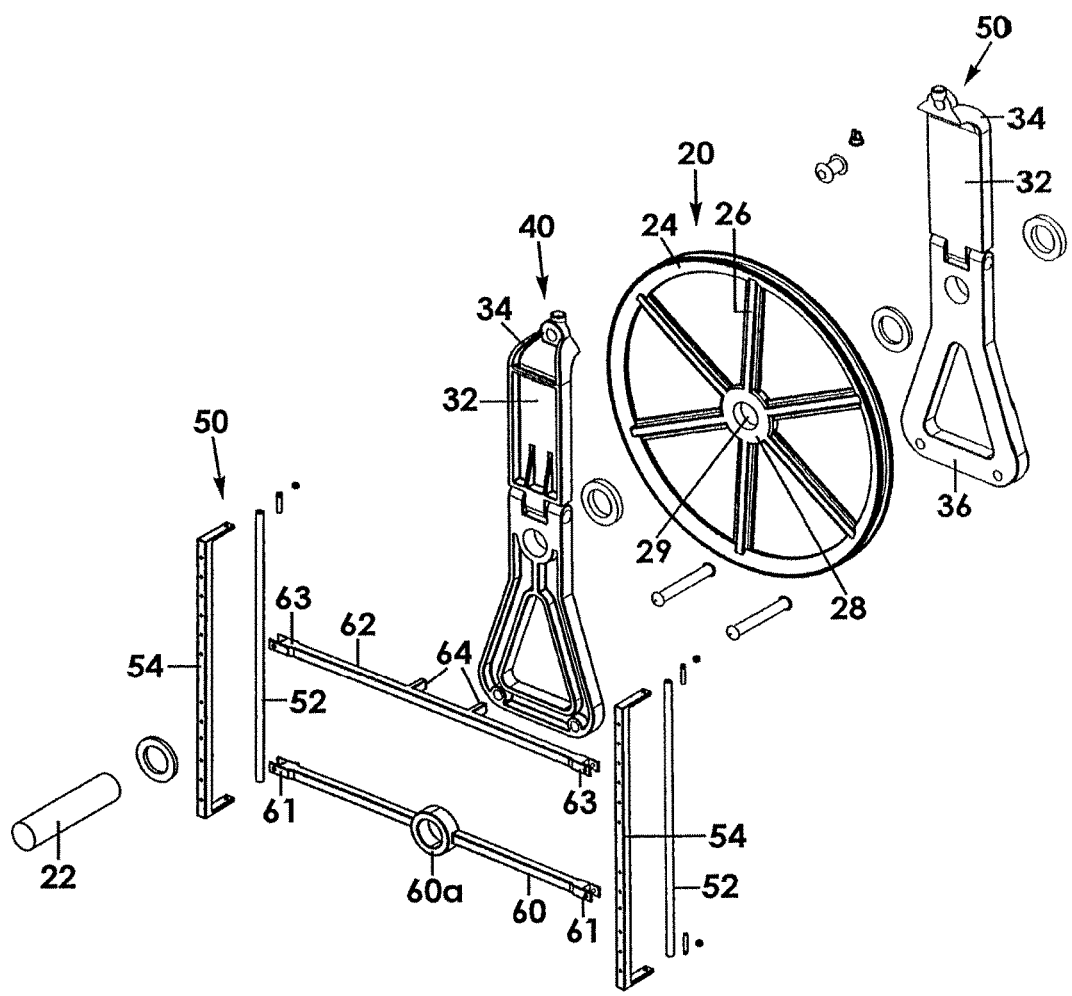
FIG. 3 is an exploded view of the stringer wheel and cable guide apparatus as in FIG. 2.

The stringer wheel and cable guide apparatus 10 includes a wheel assembly 20 and a cable guide assembly 50. The wheel assembly 20 includes a hub 22 and a generally circular rim 24 displaced from the hub 22. More particularly, the hub 22 may be a cylindrical rod having a linear configuration as it functions as an axle defining a longitudinal axis about which other components are rotatably coupled as will be described later. The rim 24 includes a circular configuration and is displaced from the hub 22 by a plurality of spaced apart spokes 26 that extend radially between the hub 22 and rim 24. In other words, each spoke 26 includes a proximal end operatively coupled to the hub 22 and a distal end coupled to an inner face of the rim 24 (FIG. 3).

The wheel assembly 20 may include a center section 28 that defines a bore 29 through which the hub 22 is received so that the wheel assembly 20 is selectively rotatable about the hub 22 and its axis. In an embodiment, proximal ends of the spokes 26 are coupled to the center section 28 and the center section 28 is rotatably coupled to the hub 22 (FIG. 3). The rim 24, therefore, is operatively and rotatably coupled to the hub 22.

The rim 24 includes an outer face that defines a groove 25 (FIGS. 2 and 5) having a depth suitable to receive a conductor cable or other transmission line (not shown), the rim 24 being configured to rotate about the hub 22 as a cable is drawn over and across it due to friction caused by the pulled cable. It is understood that wheel assemblies according to various embodiments may include different diameters, outer faces of narrower or wider widths, and grooves of various depths depending on the size or type of cable being strung or tensioned. The wheel assembly 20 as a whole defines a first imaginary plane. Specifically, the center section 28, spokes 26, and side surfaces of the rim 24 are situated within the first imaginary plane.

The wheel assembly 20 may also include a carriage 30 configured so that the hub 22 and rim 24 combination may be hoisted into the air (such as by a helicopter or crane) or mounted to a tower, or the like during a cable stringing or tensioning procedure. The carriage 30 may include a first leg member 32 positioned adjacent one side of the hub 22 and a second leg member 32 positioned adjacent another side of the hub 22. (the leg members are intentionally referred to by the same reference numeral as they have substantially the same construction.

Each leg member includes a lower end 36 situated lowerly beyond a lower peripheral edge of the rim 24 and an upper end 34 situated upwardly beyond an upper peripheral edge of the rim 24. The carriage 30 may include a bridge 38, i.e. a section that connects respective upper ends of the first leg member 32 to the second leg member 32. One or both of the leg members may be coupled to the hub 22 but, preferably, with a bearing or the like that does not result in the carriage 30 rotating with the hub 22.

The wheel assembly 20 may need to be suspended from a tower or carried by a helicopter or crane to a desired location and position where an electrically conductive cable or communication wire is to be pulled and tensioned. Accordingly, a main coupling 40 may be mounted atop the bridge 38 that enables the carriage 30 and entire wheel assembly 20 to be hoisted by a chain, cable, or other tethering device. The carriage 30 includes a base section 42 mounted to an upper surface of the bridge 38. A mounting section 44 is then rotatably coupled to the base section 42 and is configured such that a hook or coupling from the tether of a crane or fastener from a tower may be attached.

In another aspect, the cable guide assembly 50 includes a framework that is coupled to the wheel assembly 20 and positioned adjacent thereto so as to keep a cable properly nested in the groove 25 of the rim 24. The guide assembly 50 includes a pair of roller members 52 rotatably coupled to opposed ends of the framework and configured to rotate as a cable is drawn over and across it due to friction caused by the pulled cable. Each roller member 52 has a generally cylindrical configuration, such as a rod, and a generally elongated configuration. Further, the framework includes a pair of spaced apart upstanding support members 54 positioned proximate and adjacent to respective roller members 52.

In an embodiment, the cable guide assembly 50 may only include a single roller member 54 positioned adjacent one of an upstream or downstream end of the rim 24. In an embodiment, the roller member may be coupled to the framework in a fixed and non-rotatable configuration.

Figure 1:
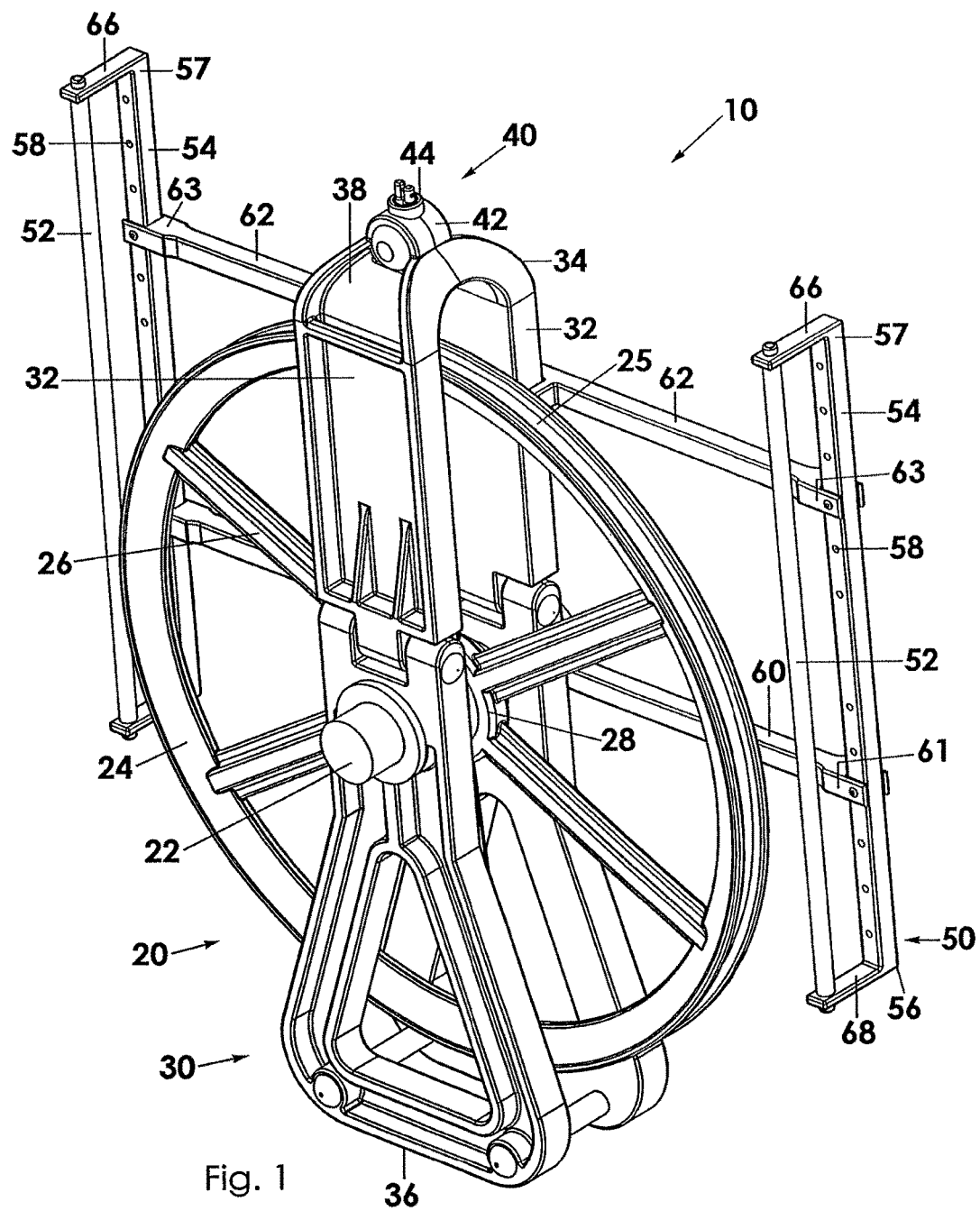
FIG. 1 is a front perspective view of a stringer wheel and cable guide apparatus according to a preferred embodiment of the present invention.
Figure 2:
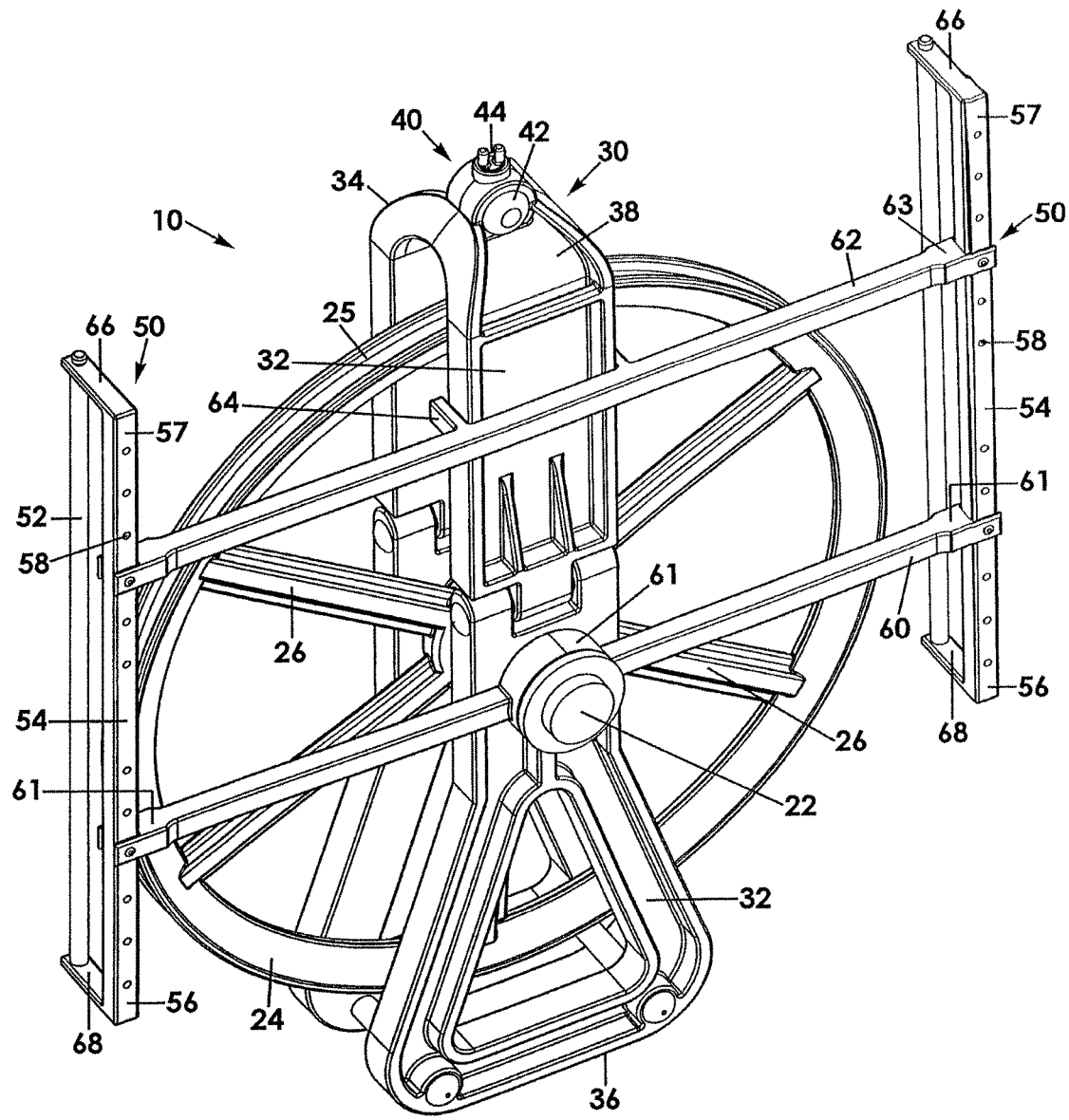
FIG. 2 is a rear perspective view of the stringer wheel and cable guide apparatus as in FIG. 1.

The framework includes a first strut 60 extending between the spaced apart upstanding support members 54. In an embodiment, the support members 54 have a generally vertical orientation in the manner of support posts and the first strut 60 has a generally horizontal configuration joining and spacing apart the support members (FIG. 2). In an embodiment, the first strut 60 is coupled to the hub 22 preferably with a bearing 60a or the like so that the framework is not rotated about the imaginary axis defined by the hub 22. The support members 54 are positioned adjacent upstream and downstream ends of the rim 24 as will be described more fully later.

Each support member 54 includes a lower end 56 and an opposed upper end 57, the support member 54 having a generally linear configuration. Further, each support member 54 includes an upper flange 66 extending perpendicularly away from each respective upper end 57 and a lower flange 68 extending perpendicularly away from each respective lower end 56. Each flange extends in the direction toward the wheel assembly 20. Opposed ends of respective roller members 52 are rotatably coupled to respective upper 66 and lower 68 flanges 68 respective support members 54. Accordingly, there is a roller member 52 associated with each support member 54. More particularly, a roller member 52 is adjacent and parallel to the support member 54 to which it is operatively coupled via respective upper and lower flanges.

Figure 13:
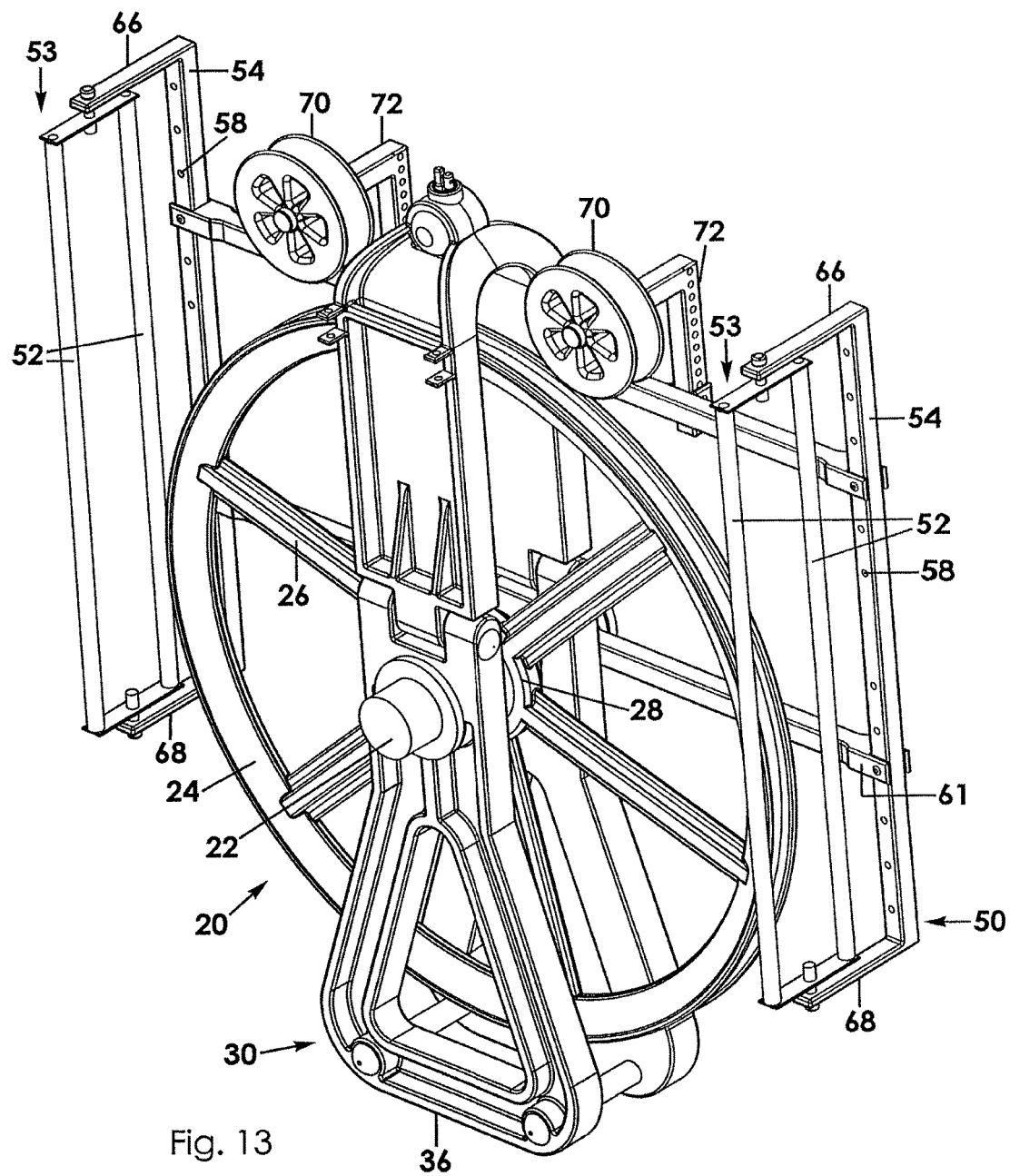
FIG. 13 is a perspective of a stringer wheel and cable guide apparatus according to another embodiment in which a roller assembly having a pair of spaced apart rollers is pivotally coupled to a respective flange of a respective support member and extends adjacent one of an upstream or downstream end of the wheel assembly.

In an embodiment, a roller assembly 53 having a pair of spaced apart roller members 54 may be pivotally coupled to terminal ends of respective flanges 66, 68 (FIG. 13). The pair of spaced roller members 54 of the roller assembly 53 are configured to be positioned adjacent an upstream end and downstream end of the rim 24 such that a conductor cable may be extended between the roller members 54 and thus guided effectively in the event the cable is directed rearwardly or forwardly of the wheel assembly 20. In an embodiment, the roller assembly 53 may be swiveled between a position substantially parallel with the wheel assembly 20 (FIG. 15) or substantially perpendicular thereto (FIG. 13) or to a desired angle. With this construction, a user has more options for guiding a conductor cable efficiently in various directions.

Figure 14:
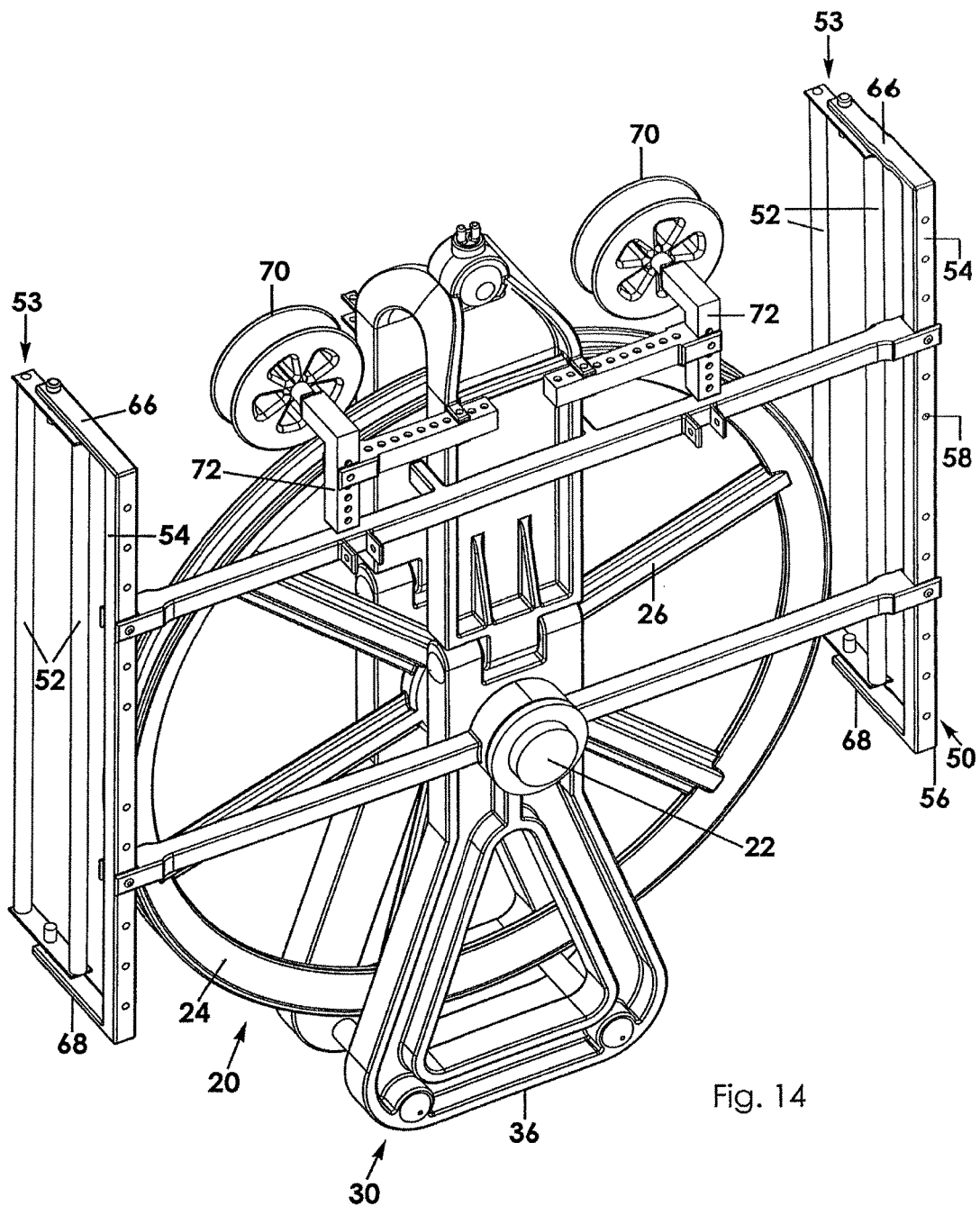
FIG. 14 is a perspective view of a cable guide apparatus having an auxiliary wheel operatively coupled to the carriage of the wheel assembly and positioned inline with the groove of the rim of the stringer wheel and cable guide assembly.
Figure 15:
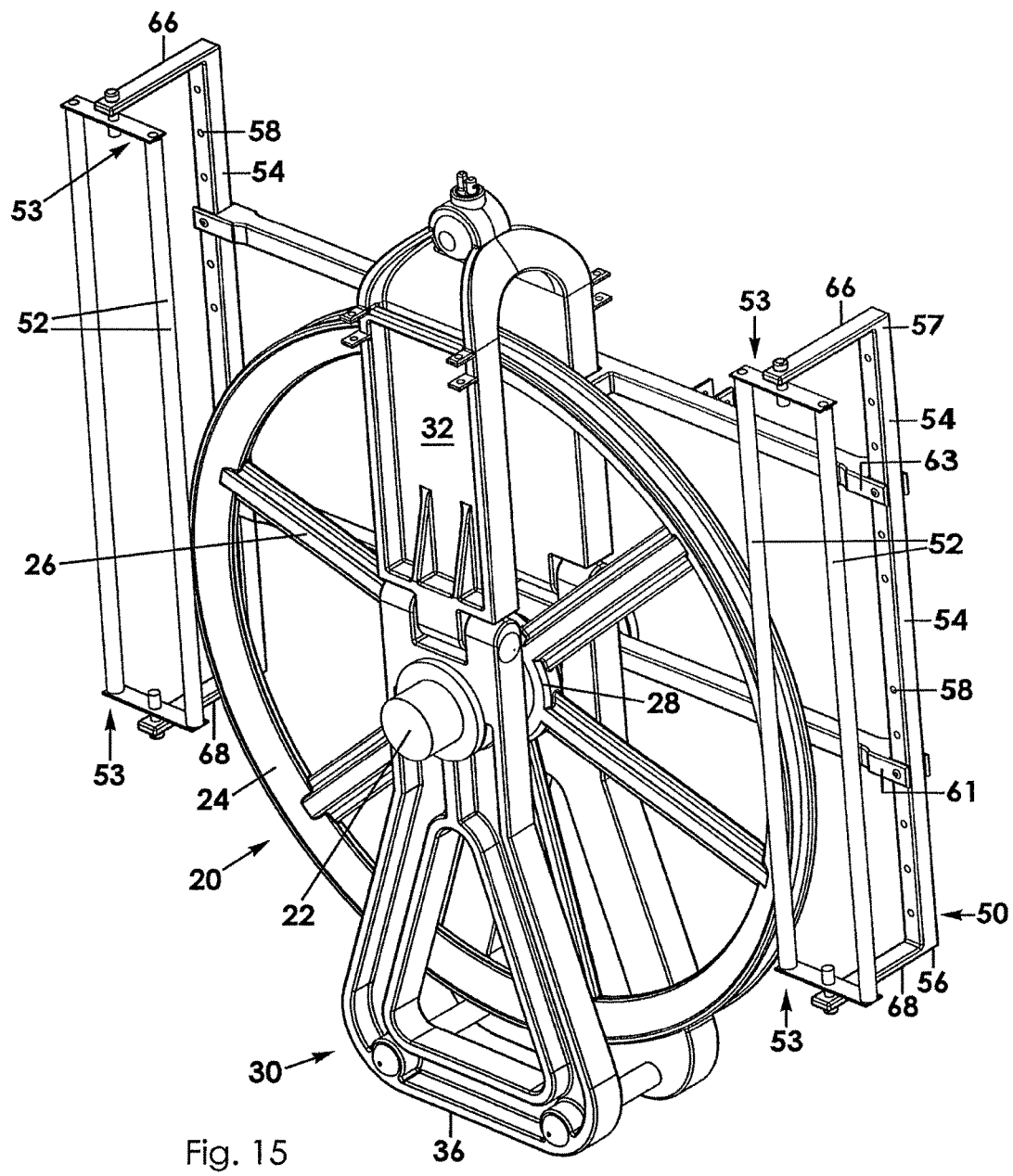
FIG. 15 is a perspective of a stringer wheel and cable guide apparatus according to another embodiment in which a roller assembly having a pair of spaced apart rollers is pivotally coupled to a respective flange of a respective support member and extends adjacent one of an upstream or downstream end of the wheel assembly.
Figure 16:
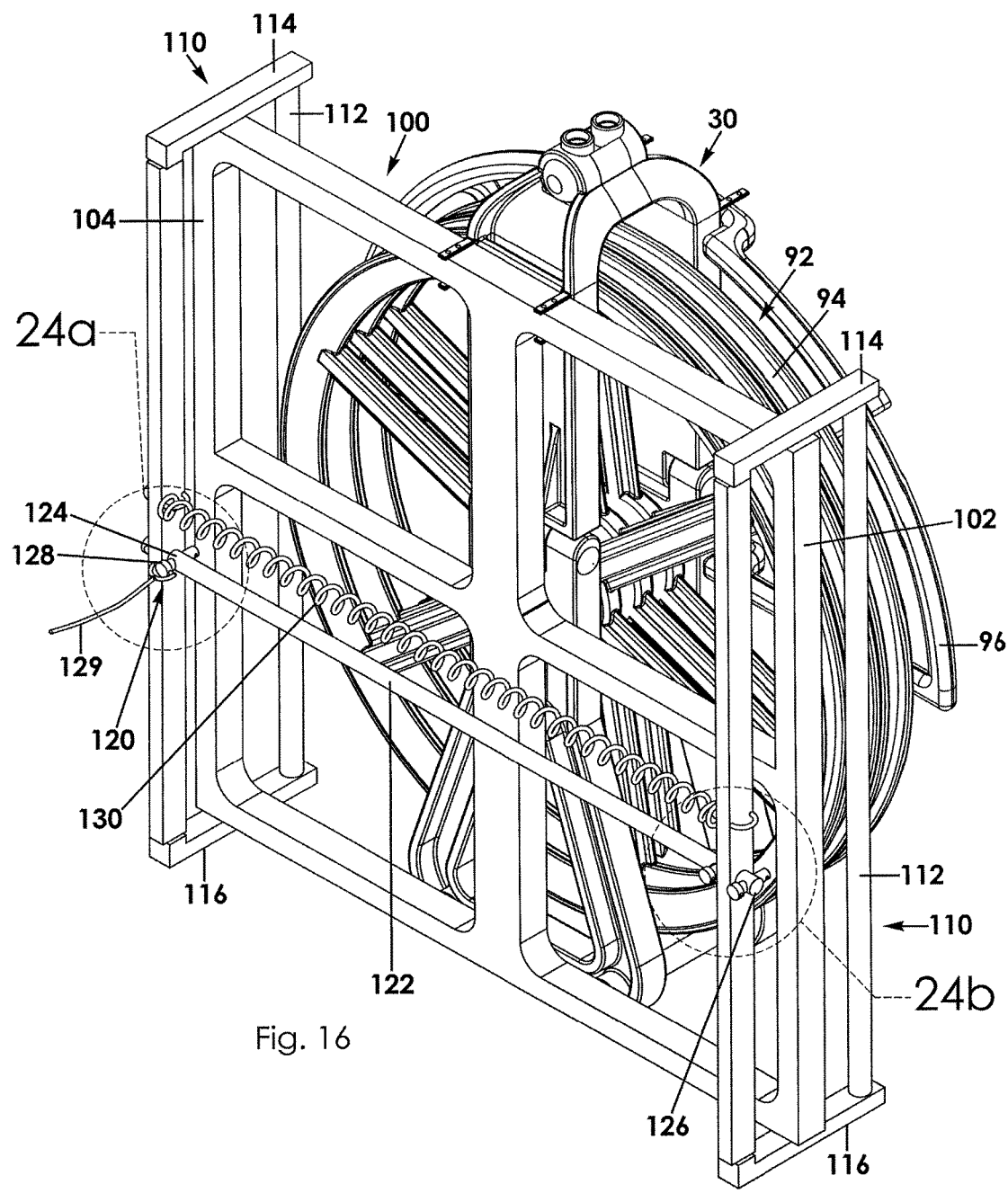
FIG. 16 is a perspective view of a cable guide actuator apparatus according to a preferred embodiment of the present invention, illustrated with the roller assemblies in a deployed and locked configuration.
Figure 17:
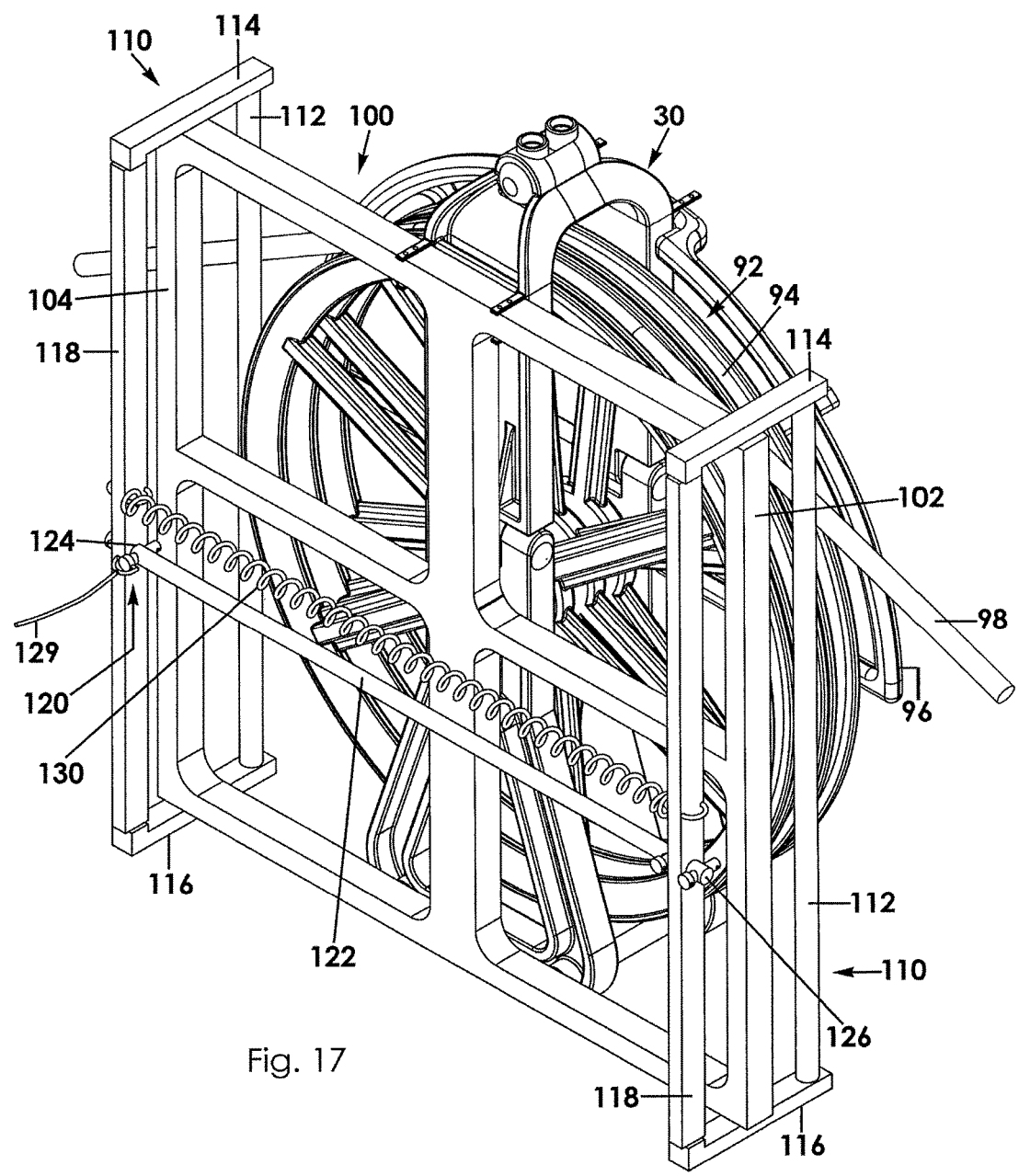
FIG. 17 is another perspective view of the cable guide actuator apparatus as in FIG. 16, illustrated with a leader cable being pulled across the wheel assembly.
Figure 18:
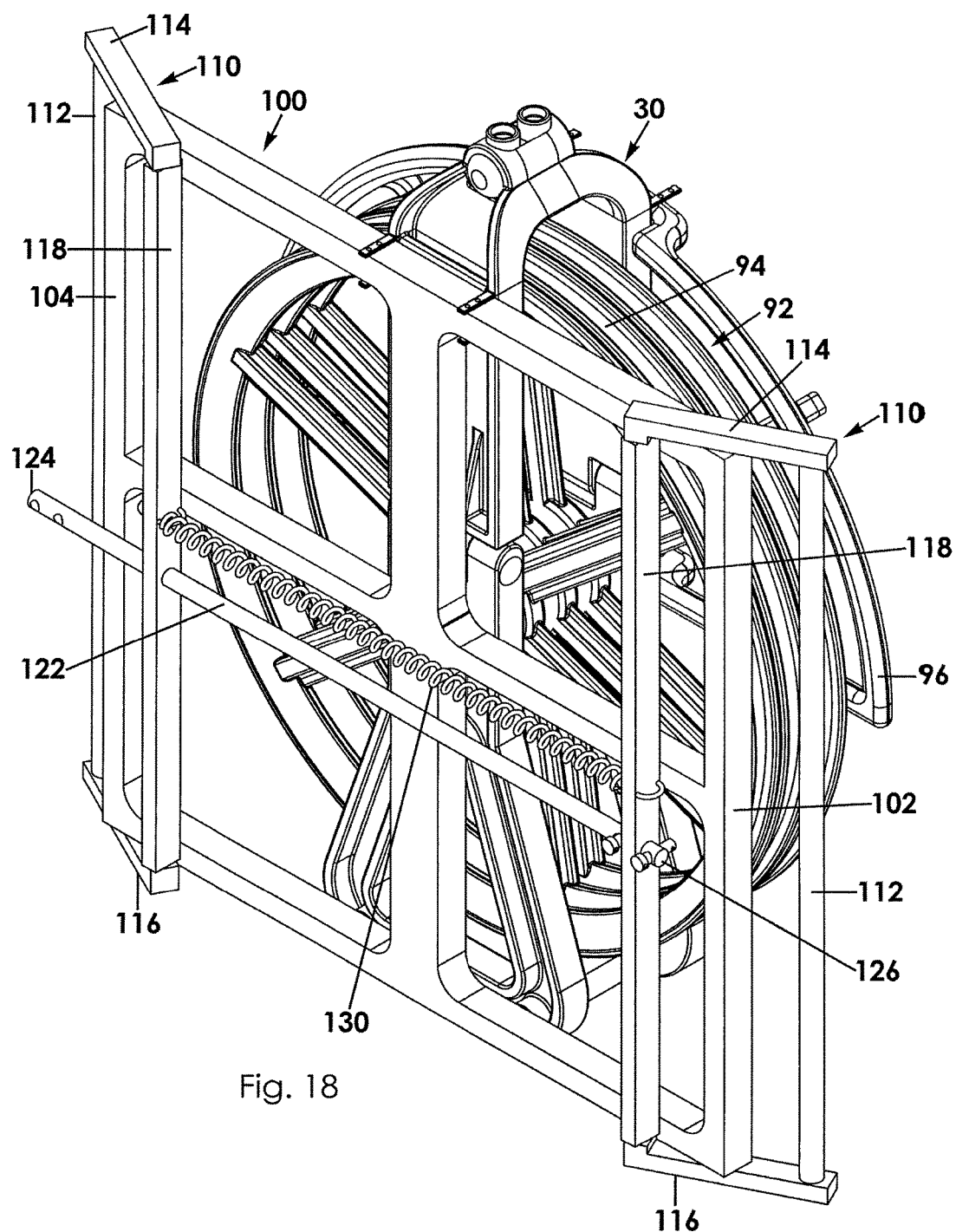
FIG. 18 is another perspective view of the cable guide actuator apparatus as in FIG. 16, illustrated with the roller assemblies in a released configuration.
Figure 19:
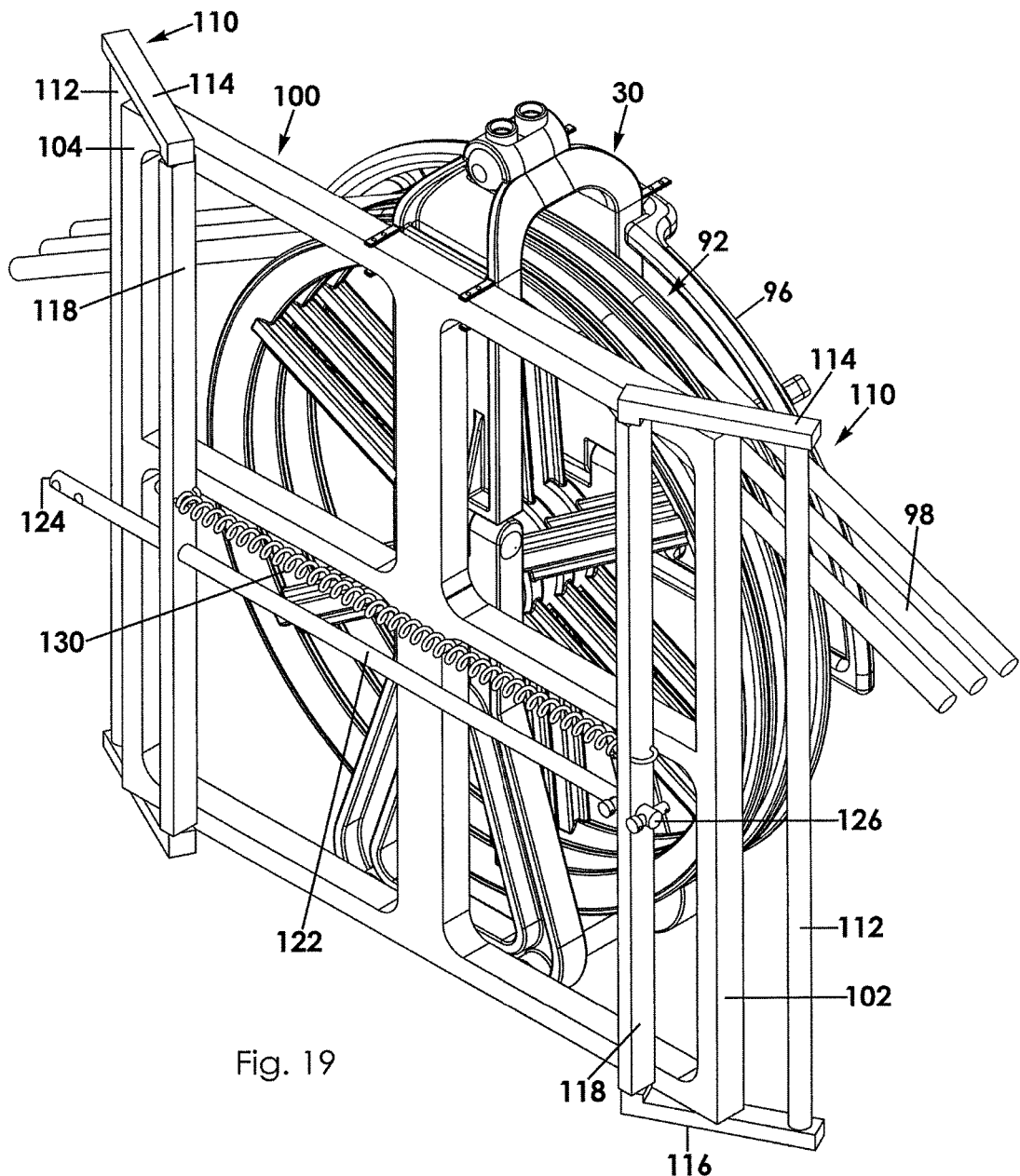
FIG. 19 is a perspective view of the cable guide actuator apparatus as in FIG. 18, illustrated with a plurality of cables extending across the wheel assembly.
Figure 20:
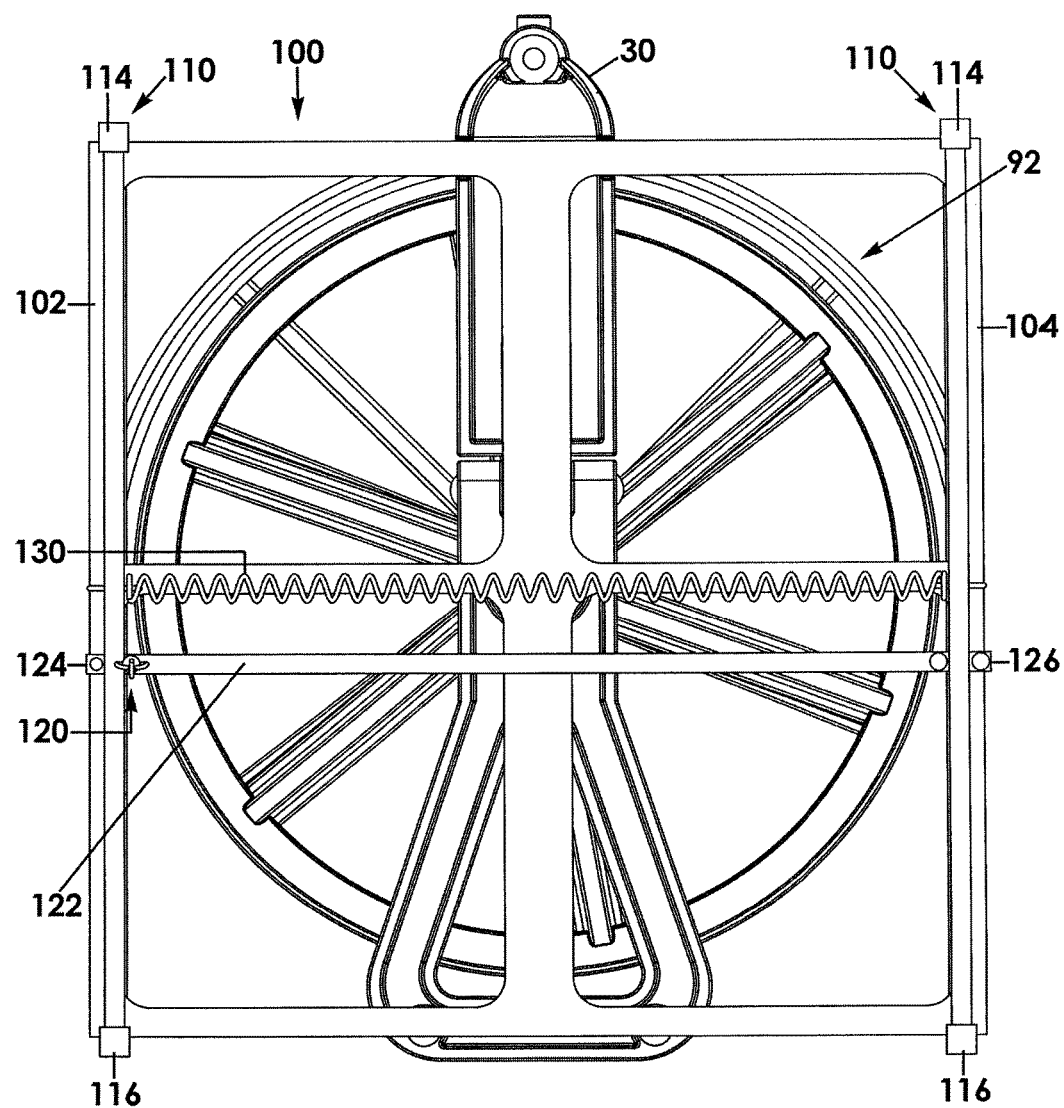
FIG. 20 is a side view of the cable guide actuator apparatus as in FIG. 16.
Figure 21:
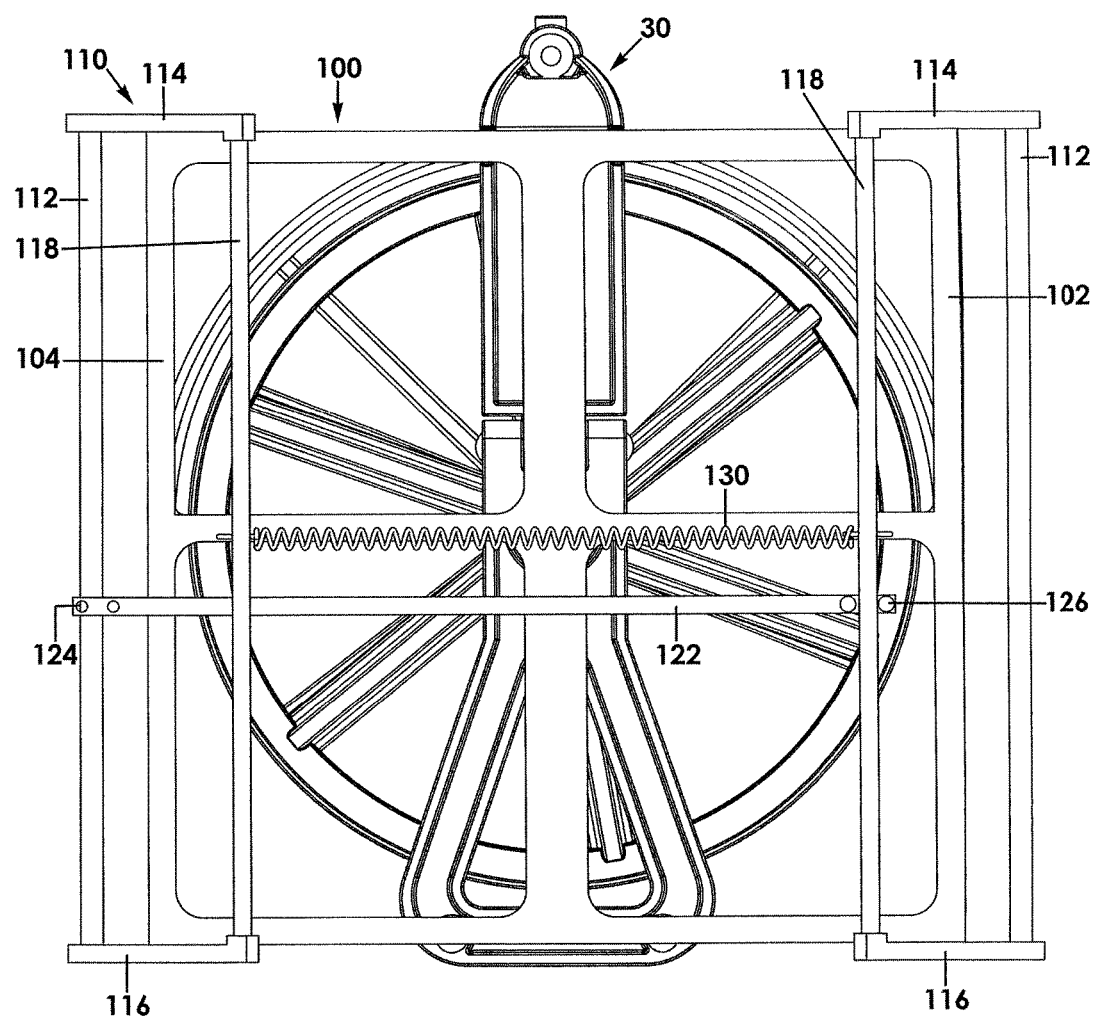
FIG. 21 is a side view of the cable guide actuator apparatus as in FIG. 18.
Figure 23A:
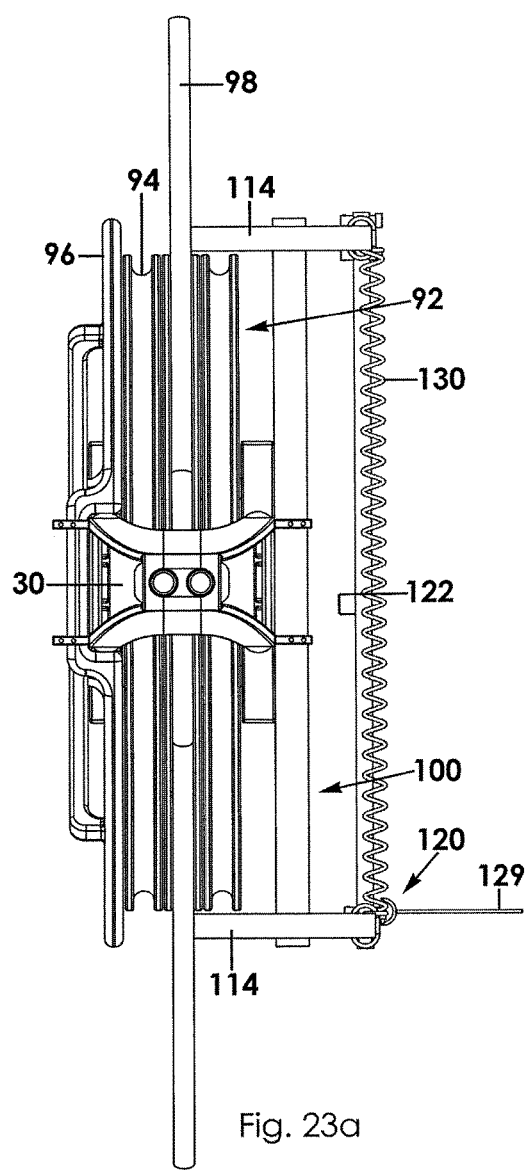
FIG. 23a is a top view of the cable guide actuator apparatus as in FIG. 16.
Figure 23B:
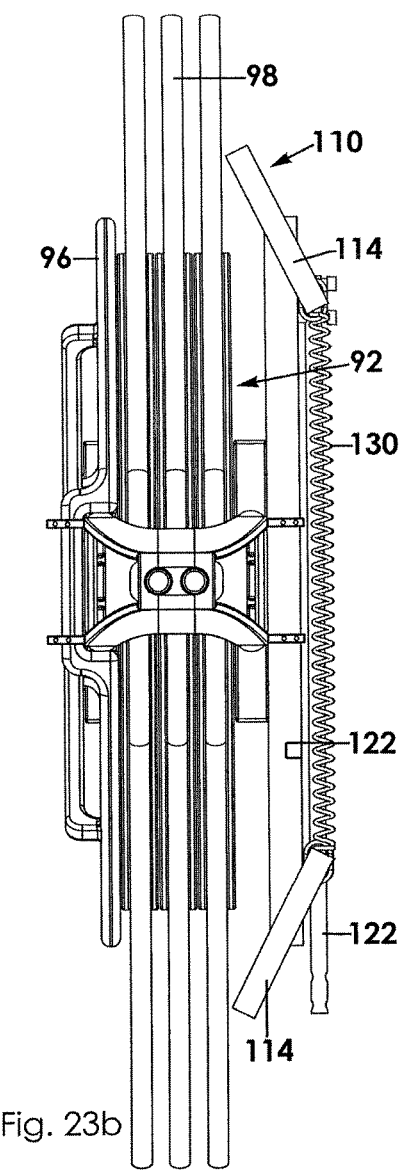
FIG. 23b is a top view of the cable guide actuator apparatus as in FIG. 18.
Figure 24A:
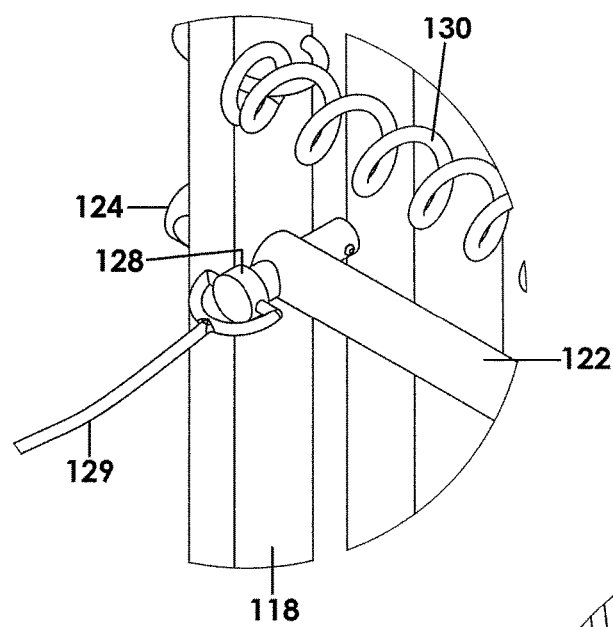
FIG. 24a is an isolated view on an enlarged scale taken from FIG. 16.
Figure 24B:
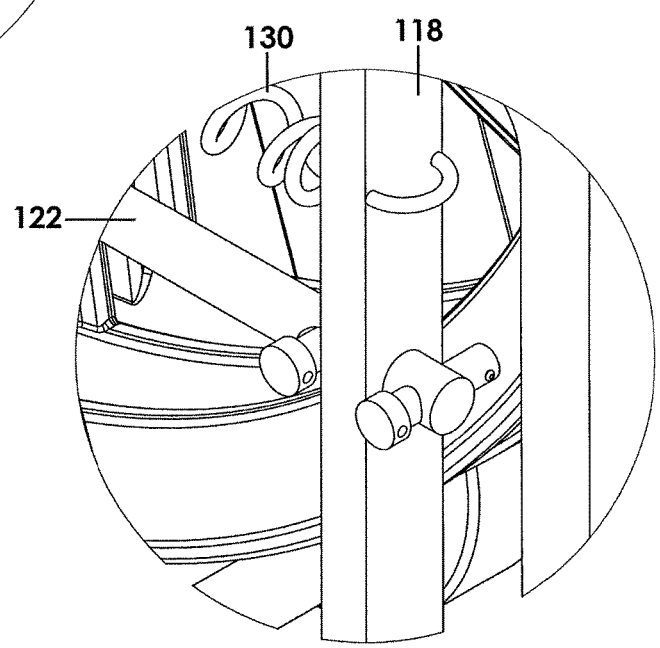
FIG. 24b is an isolated view on an enlarged scale taken from FIG. 16.

FIG. 15 illustrates an exemplary embodiment in which the roller assembly 53 is positioned adjacent a far side of the wheel assembly 20 relative to the guide assembly 50. When swiveled to the parallel configuration, both spaced apart roller members 54 of a roller assembly 53 are adjacent the far side of the wheel assembly 20. When swiveled to a perpendicular configuration, one roller member 54 is positioned adjacent either side of the rim 24 (FIGS. 13 and 14). It is understood that respective flanges 60 may have length dimensions that determine whether the roller assembly 53 is situated on a far side or near side of the wheel assembly 20. In an embodiment, the flanges 60 may be length adjustable (not shown).

In an embodiment shown in FIGS. 12-15, the stringer wheel and cable guide apparatus includes an auxiliary wheel 70 operatively coupled to the guide assembly 50, such as with a bracket 72. More particularly, the bracket 72 may have a first end coupled to a second strut 62 of the framework of the guide assembly 50 and an opposed second end coupled to the auxiliary wheel 70, the bracket 72 being configured to position the auxiliary wheel 70 inline with the groove 25 of the rim 24 of the wheel assembly 20. Preferably, the auxiliary wheel 70 has a dimension that is substantially smaller than a width of the rim 24 itself and the bracket 72 positions the auxiliary wheel 70 adjacent an upward extent of the rim 24 so as to maintain a conductor cable in the groove 25 even if being directed in a sharply upward direction toward a next downstream wheel assembly 20. The bracket 72 may be position-adjustable, such as with an aperture/pin construction, so that the position of the auxiliary wheel 70 relative to the rim 24 may be adjustable.

In an embodiment similar to that described immediately above, the auxiliary wheel 70 may be coupled directly to the carriage 30 of the rim 24 of the wheel assembly 20 without regard to the guide assembly 50 (FIG. 14). In other words, the auxiliary wheel 70 may be used independently with a rim 24. Specifically, the first end of the bracket 72 may be coupled to the carriage 30 and the second end of the bracket 72 to the auxiliary wheel 70 for positioning the auxiliary wheel 70 inline with the groove 25 of the rim 24.

The framework may include a second strut 62 extending between the spaced apart support members 54. The second strut 62 is parallel to and spaced apart from the first strut 60 (FIG. 2). The second strut 62 may include a pair of spaced apart alignment or guide bars 64 extending perpendicularly away from an inner surface of the second strut 62. The guide bars 64 are specifically configured to surround or receive a respective leg member 32 of the carriage 30 therebetween (FIG. 2). It is important that the framework of the cable guide assembly 50 fit snugly and surely to the wheel assembly 20 so that a cable being extend along the groove 25 of the rim 24 is appropriately contacted by respective roller members 52 and, as a result, maintained in a nested arrangement in the groove 25.

In an embodiment, each support member 54 may include a plurality of spaced apart apertures. Cooperatively, opposed ends of the first strut 60 and second strut 62 include fasteners 61, 63, respectively, such as brackets, clasps, clips, or the like, that may be aligned with selected apertures 58 and secured with pins, screws, bolts, or the like (FIG. 3). In use, the support members 54 may be adjusted vertically as may be appropriate and desirable based on the size of the rim 24 of the wheel assembly 20 to which the guide assembly 50 is attached. Preferably, the framework is adjusted such that one roller member 52 is positioned on an upstream (incoming) side of the rim 24 and another roller member 52 is positioned on a downstream (outgoing) side of the rim 24.

The framework—specifically, the upstanding support members 54 and first strut 60 that connects them—defines a second plane. When the framework is coupled to the wheel assembly 20 as described above, the wheel assembly 20 and framework of the cable guide assembly 50 are parallel to one another. In other words, the first plane is parallel to the second plane as defined above.

In use, the framework of the cable guide assembly 50 of the stringer wheel and cable guide apparatus is coupled to the wheel assembly 20. More particularly, the second strut 62 of the framework may be coupled to the hub 22 of the wheel assembly 20 or to another component thereof. The support members 54 may be vertically adjusted as described above such that the pair of roller members 52 are appropriately positioned adjacent upstream and downstream peripheral ends of the rim 24 of the wheel assembly 20. Specifically each roller member 52 is positioned slightly to one side of precisely where the cable will enter or leave a nested position in the groove 25 defined by the outer face of the rim 24. Accordingly, if a prior wheel assembly or next wheel assembly to be encountered by a cable is at an angle or even perpendicular to the present wheel assembly 20, the cable will encounter a respective roller member 52 and not risk jumping out of the groove 25.

It is understood that if the cable needs to be angled in an opposite angle or direction, a cable guide assembly 50 may be positioned and coupled to an opposite side of a respective wheel assembly 20 and will function in all substantial respects as described above to again maintain the cable in its nested arrangement in the groove 25 of the rim 24. It is also understood that any reference above to "vertical" or "horizontal" is by way of illustration of an exemplary embodiment but not limiting in that the present invention will work however it is oriented relative to a cable.

In another aspect of the invention, the present invention includes an actuator assembly configured to enable respective roller members 112 to be selectively deployed adjacent the rim 96 of the wheel assembly 92 or to be displaced from the wheel assembly 92. When the roller members 112 are displaced, a leading cable (also known as a "hardline") may pull a so-called running board (also known as a "headboard") across the wheel assembly 92 and, thereafter, a plurality of spaced apart conductor cables. For example, a 3-bundle refers to pulling three conductor cables over the wheel assembly 92, a 4-bundle refers to pulling four conductor cables over the wheel assembly 92, and so on. It is understood that the actuator assembly disclosed herein may be adapted to work with any size wheel assembly 92 so as to accommodate bundles of corresponding sizes and numbers of cables. The operative surface of the wheel assembly 92 may define the number of grooves as will be necessary to nest the same number of conductor cables.

For purposes of discussion of the actuator assembly, the framework 100 will be described as having a pair of roller assemblies 110 pivotally coupled to front 102 and rear 104 ends of the framework 100 of the guide assembly 90, each roller assembly 110 including a roller member 112 having a roller surface capable of guiding and maintaining a conductor cable in the groove 94 of the wheel assembly 92.

Each roller member 112 is configured to rotate when a conductor cable 98 is pulled across it. More particularly, a respective roller assembly 110 may include a rear portion 118 that is positioned generally parallel to a respective roller member 112. Further, each roller assembly 110 may include an upper flange 114 extending between upper ends of a respective rear portion 118 and a respective roller member 112. Similarly, a lower flange 116 may extend between lower ends of a respective rear portion 118 and a respective roller member 112. Each upper flange 114 and each lower flange 116 may be pivotally coupled to a respective end of the framework. Preferably, it is a mid-point between ends of each flange that is pivotally coupled to the framework 100—creating an axis about which a roller assembly 110 may selectively rotate between deployed and released configurations as will be described below.

When the framework 100 of the guide assembly 90 is coupled to a wheel assembly 92 as described above, each roller assembly 110 is pivotally movable between a deployed configuration at which a respective roller member 112 is positioned adjacent the rim 96 of the wheel assembly 92 and, thus, adjacent the groove 94 or grooves defined thereby and a released configuration at which a respective roller member 112 is displaced from the rim 96 of the wheel assembly 92. At the deployed configuration, a starter cable (also referred to as a "hardline") may pass along the surface of the wheel assembly 92 but a running board is blocked from similar passage, whereas the running board would be allowed to pass when the roller members are positioned at the released configuration.

Further, a locking assembly 120 may extend between the pair of roller assemblies 110 and is configured to selectively hold the roller assemblies 110 at the deployed configuration or to allow the roller assemblies 110 to move to the released configuration. The locking assembly 120 is referred to as being in a locked configuration when the roller assemblies 110 are held thereby in the deployed configuration. Conversely, the locking assembly 120 is referred to as being in an unlocked configuration when allowing the roller assemblies 110 to move to the released configuration. In an embodiment, the locking assembly 120 may include a rod 122 having opposed first 124 and second 126 ends and having a linear configuration. The first end 124 of the rod 122 may be coupled to one of the roller assemblies 110 with a fastener 128 such as a clamp, bolt, or pin. The roller assembly 110 to which the first end 124 is coupled may define an aperture and the rod 122 is configured to pass through the aperture when the fastener 128 is removed or released from the first end 124.

More particularly, the fastener 128 may be a pin extending through the rod 122 adjacent the first end 124 thereof, the fastener 128 being positioned to the inside of the roller assembly 110 such that the pin prevents the rod 122 from passing through the aperture. When the pin is removed, the rod 122 is allowed to slide freely through the aperture—according to the biasing action upon the pair of roller assemblies 110, as will be described below.

The locking assembly 120 may be actuated remotely to move from the locked configuration to the unlocked configuration. In an embodiment, the means for remotely actuating the locking assembly 120 to move to the unlocked configuration is a pull cable 129 having one end coupled to the fastener 128 selectively coupled to the first end 124 of the rod 122 and having a second end extending away from the entire locking assembly 120. For instance, the pull cable 129 may dangle from the locking assembly 120 all the way to the ground where it may be grasped and pulled by a user. In that regard, a manual pulling of the pull cable 129 results in removal of the fastener 128 so that the rod 122 may pass through the aperture and the pair of roller assemblies 110 are moved automatically to the released configuration by action of the biasing means.

Now with more particular reference to the biasing means, the actuator assembly includes a means for normally biasing the pair of roller assemblies 110 toward the released configuration when the roller assemblies 110 are not locked. In an embodiment, the biasing means is a tension spring 130 having opposed ends coupled to rear portions 104 of the pair of roller assemblies 110, respectively. The tension spring 130 is naturally biased to immediately contract or compress into a smaller and tighter space when not proactively stretched. The spring 130 may have opposed ends, each end coupled to a respective rear portion of a respective roller assembly 110.

In use, the roller assemblies 110 are initially positioned at the deployed configuration adjacent a rim of the wheel assembly 92, thus stretching or expanding the spring 130. In other words, the spring 130 is lengthened beyond its natural inclination to a shortened or compressed configuration. The locking assembly 120 may be secured between rear portions 104 of the pair of roller assemblies 110 as described above so as to hold the roller assemblies 110 at the deployed configuration. It is understood that the preparation of the spring 130 and locking assembly 120 may occur on the ground before the apparatus is hoisted into the air in use.

Figure 4:
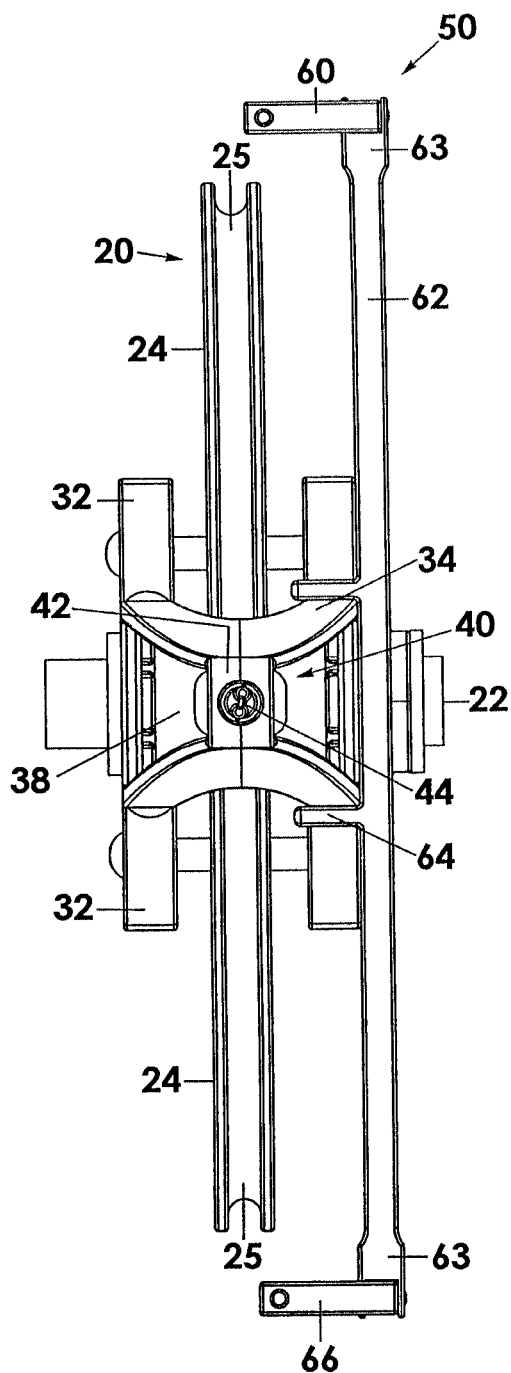
FIG. 4 is a top view of the stringer wheel and cable guide apparatus as in FIG. 1.
Figure 5:
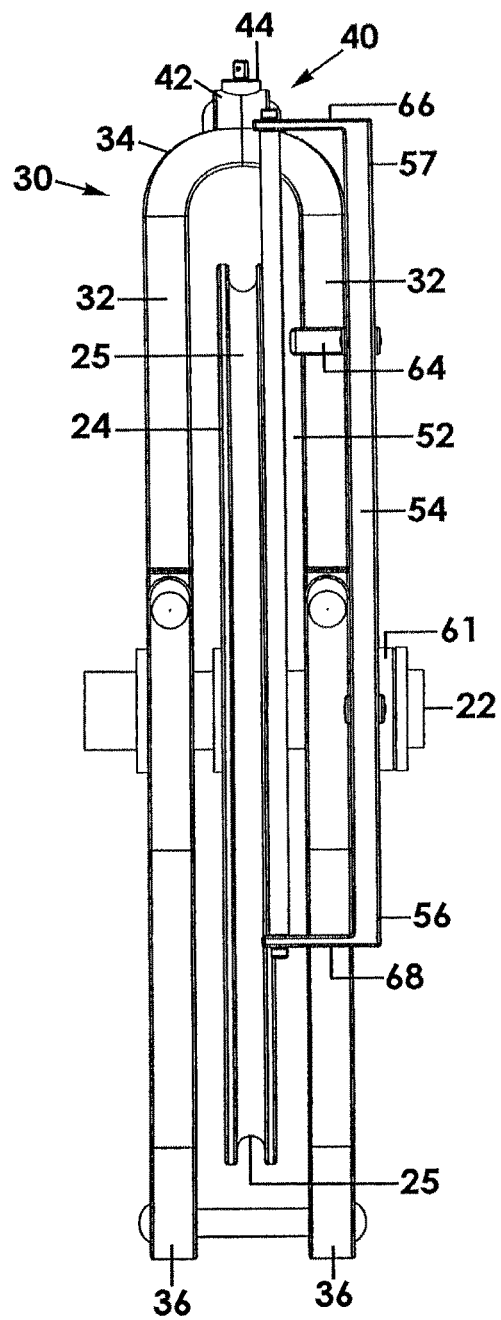
FIG. 5 is a side view of the stringer wheel and cable guide apparatus as in FIG. 1.
Figure 6:
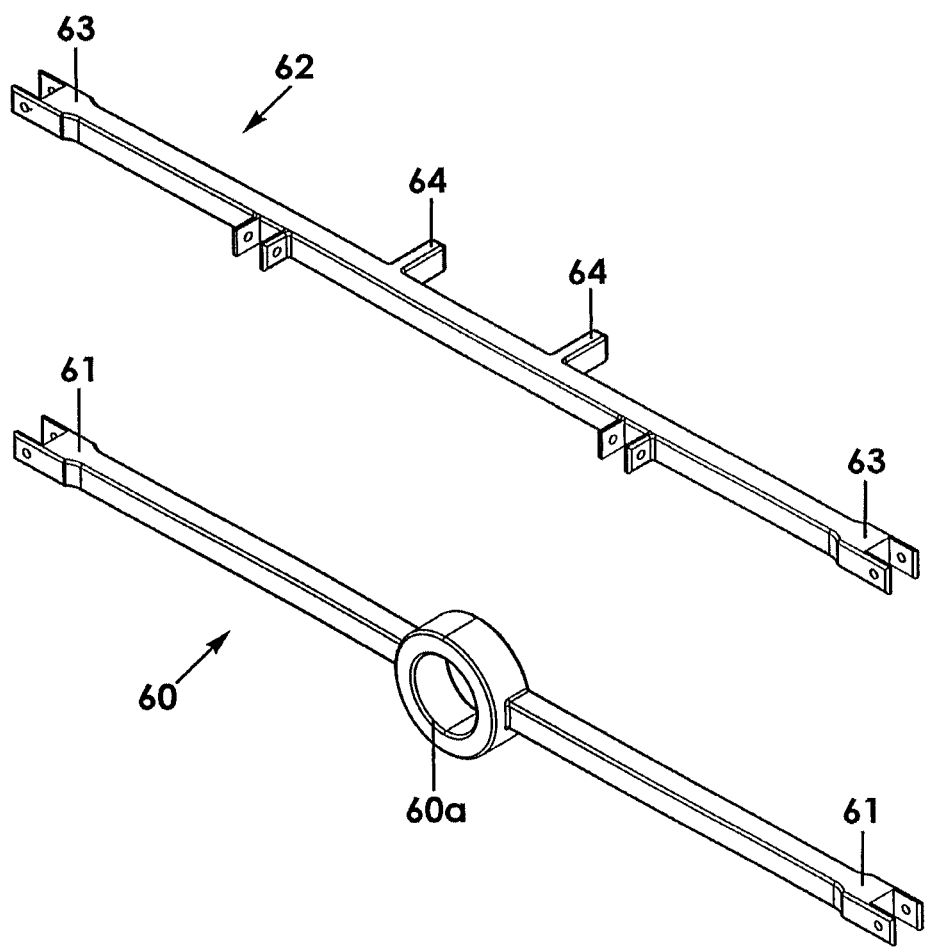
FIG. 6 is a perspective view of struts removed from the guide assembly of the stringer wheel and cable guide apparatus as in FIG. 2.
Figure 7:
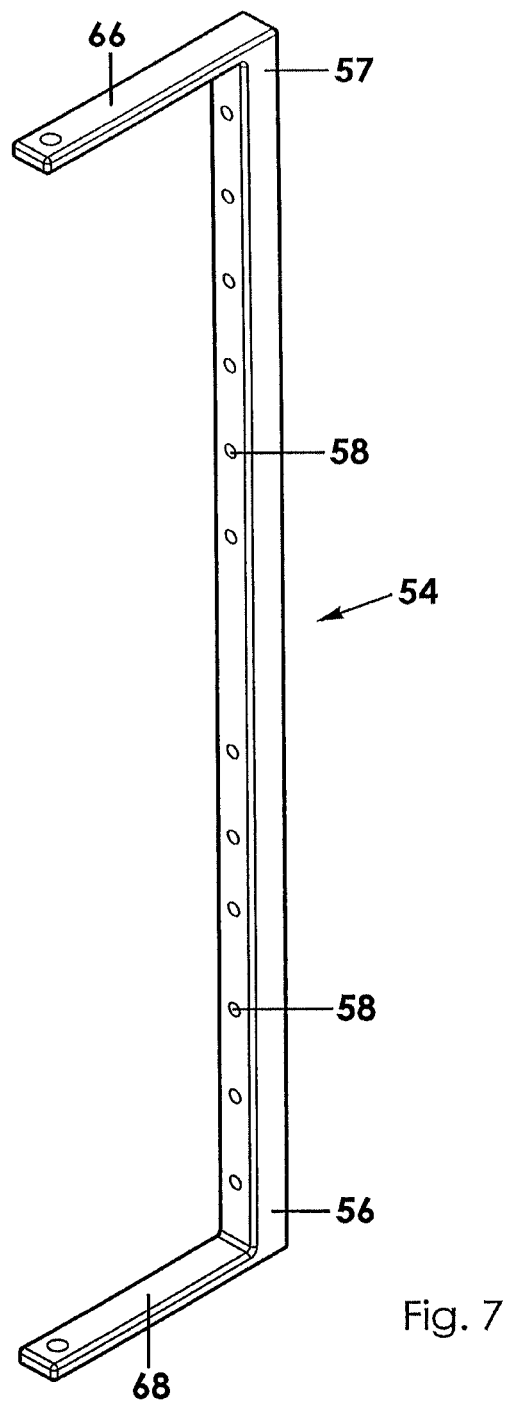
FIG. 7 is a perspective view of support members removed from the guide assembly of the stringer wheel and cable guide apparatus as in FIG. 2.
Figure 8:
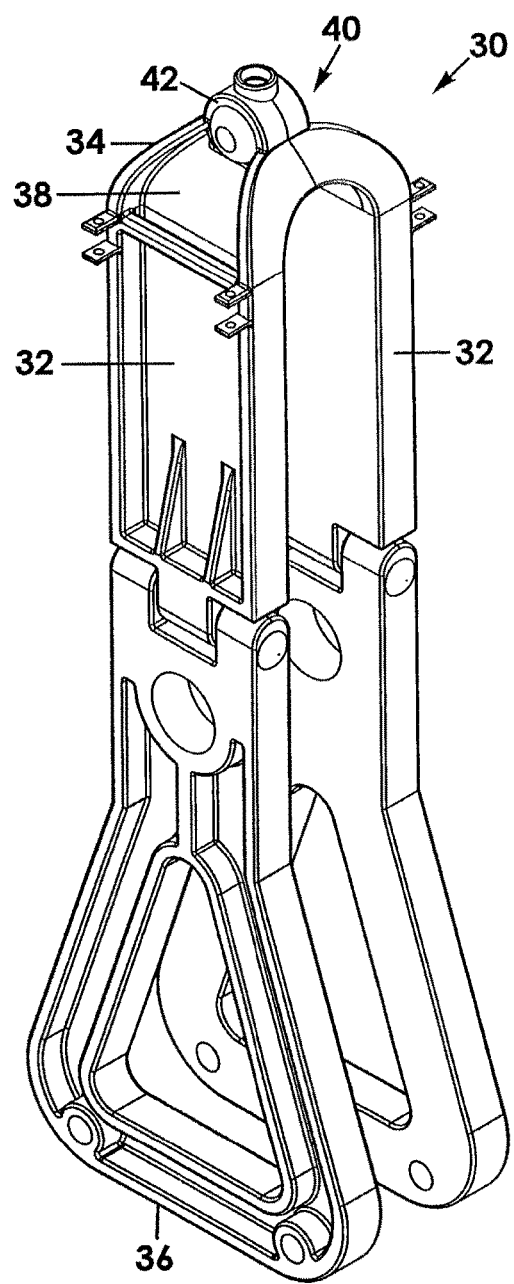
FIG. 8 is a perspective view of a carriage removed from wheel assembly of the stringer wheel and cable guide apparatus as in FIG. 2.
Figure 9:
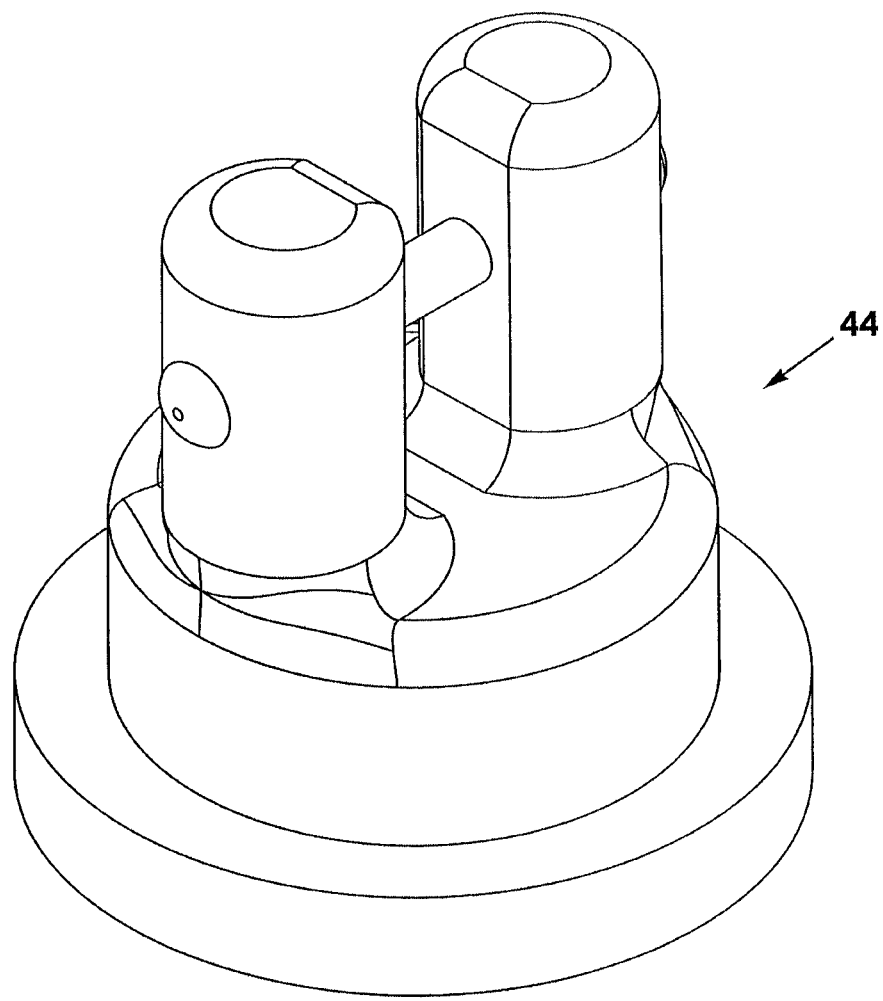
FIG. 9 is an isolated perspective view of the mounting section of the main coupling removed from the stringer wheel and cable guide apparatus as in FIG. 2.
Figure 10:
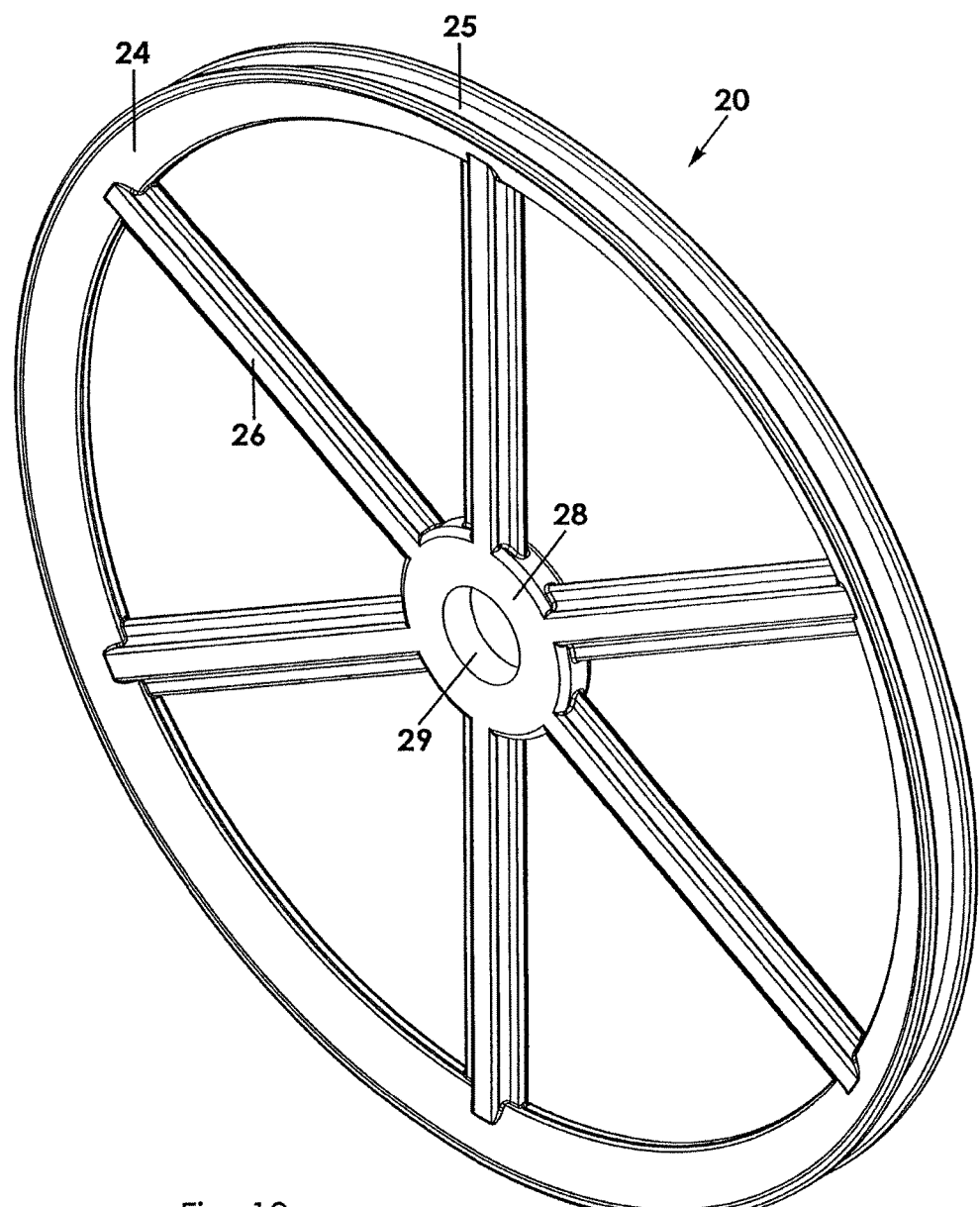
FIG. 10 is a perspective view of a wheel assembly removed from the stringer wheel and cable guide apparatus as in FIG. 1.
Figure 11:
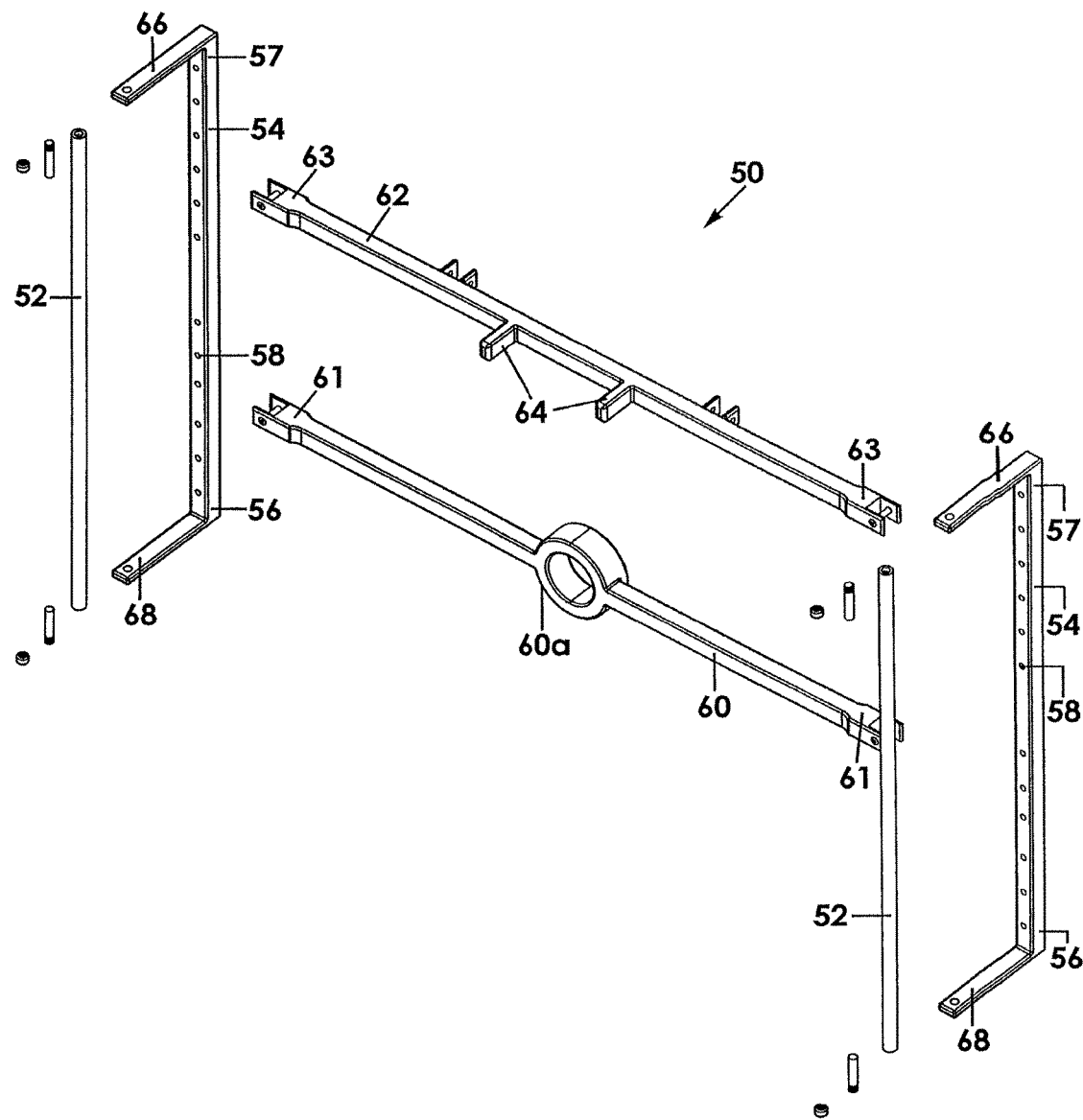
FIG. 11 is a perspective view of a cable guide assembly removed from the stringer wheel and cable guide apparatus as in FIG. 2.
Figure 12:
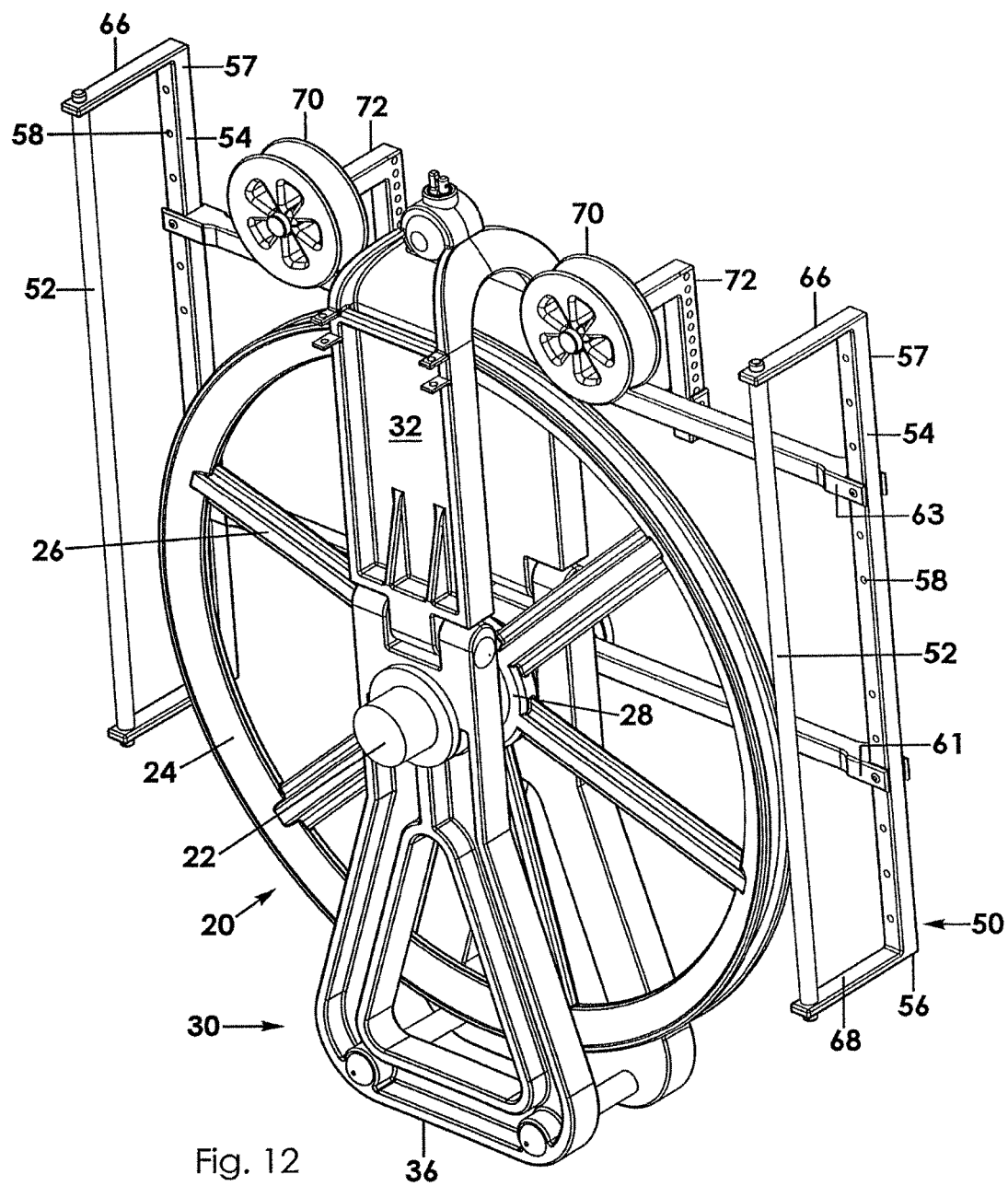
FIG. 12 is a perspective view of a cable guide apparatus having an auxiliary wheel operatively coupled to a respective upper strut of the guide assembly thereof and positioned inline with the groove of the rim of the stringer wheel and cable guide assembly.

Then, when the fastener 128 is actuated (such as by operation of the pull cord as described above), the tension of the spring 130 causes the rod 122 to slide through the aperture and the roller assemblies 110 move to the released configuration at which the roller members 112 are displaced from the wheel assembly 92. Specifically, the rear portions 118 are pulled toward one another so as to cause a pivotal movement or rotation of the roller assemblies 110 away from the rim of the wheel assembly 92. With the roller assemblies 110 displaced from the rim or edge of the wheel assembly 92, the starter cable 98 is free to pull a running board (hardine) onto the surface of the wheel assembly 92 and, subsequently, a plurality of spaced apart conductor cables (FIG. 4).

Figure 25:
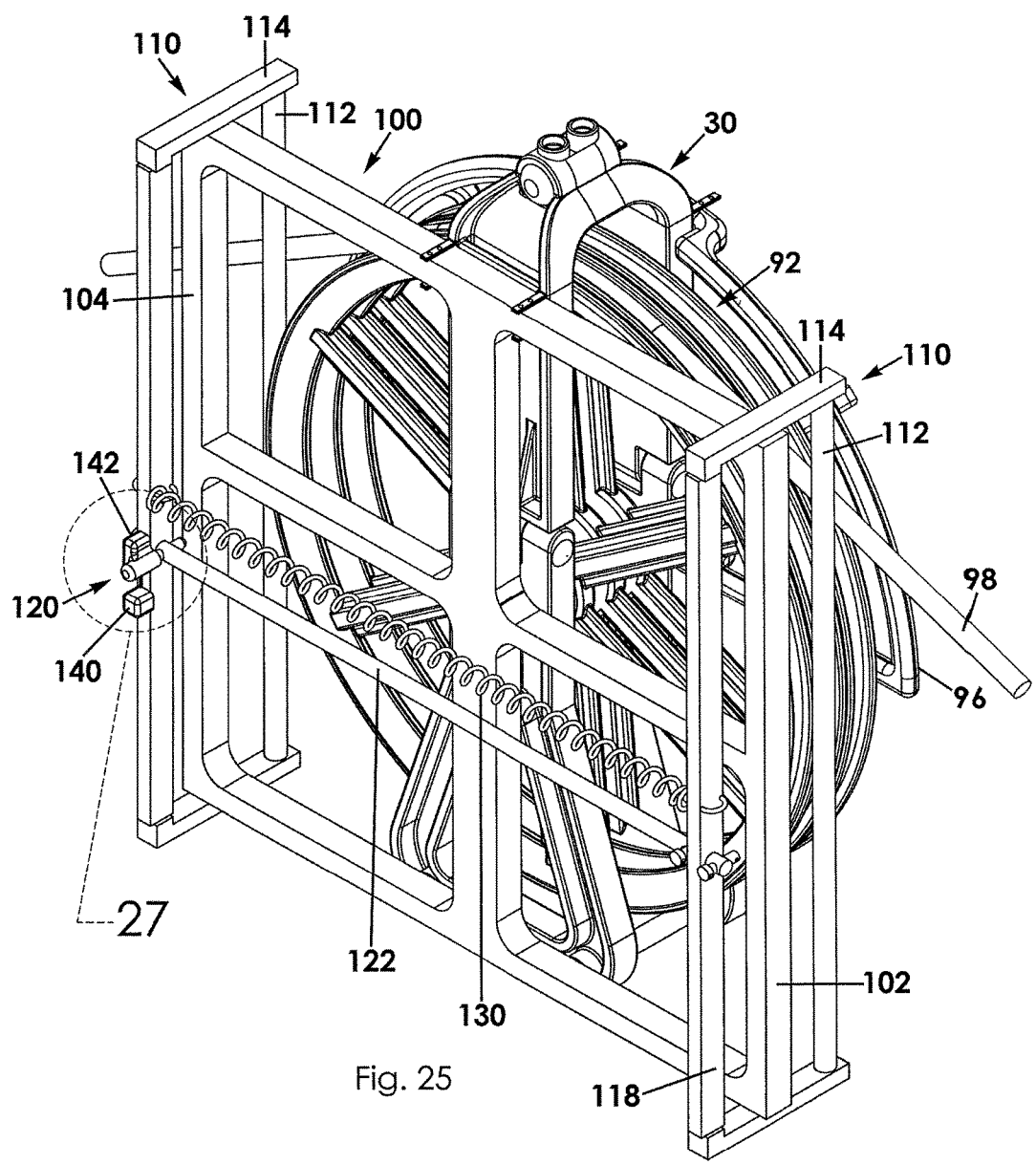
FIG. 25 is a perspective view of a cable guide actuator apparatus according to a another embodiment of the present invention, illustrated with the roller assemblies in a deployed and locked configuration.
Figure 26:
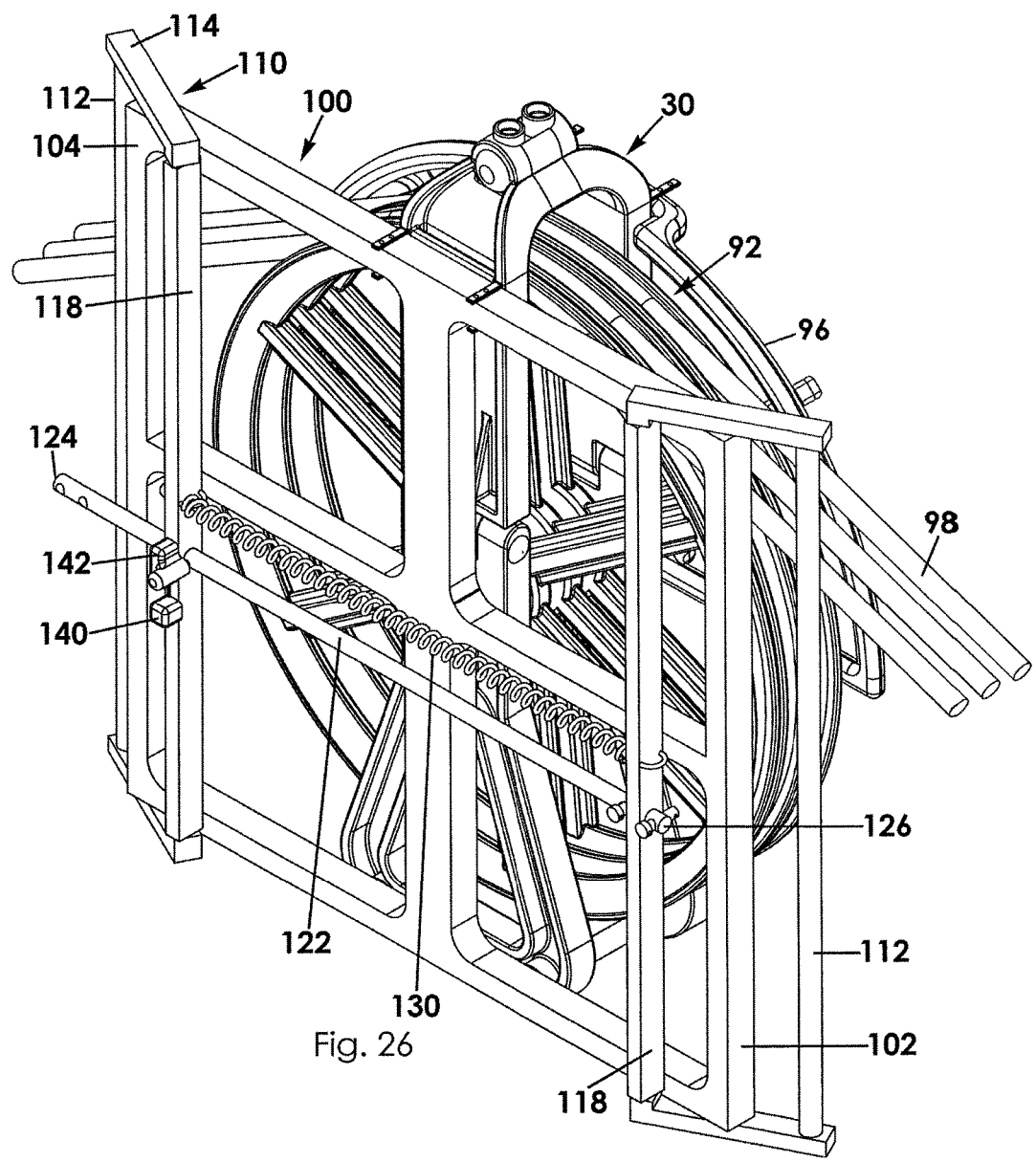
FIG. 26 is another perspective view of the cable guide actuator apparatus as in FIG. 25, illustrated with the roller assemblies in a released configuration.
Figure 27:
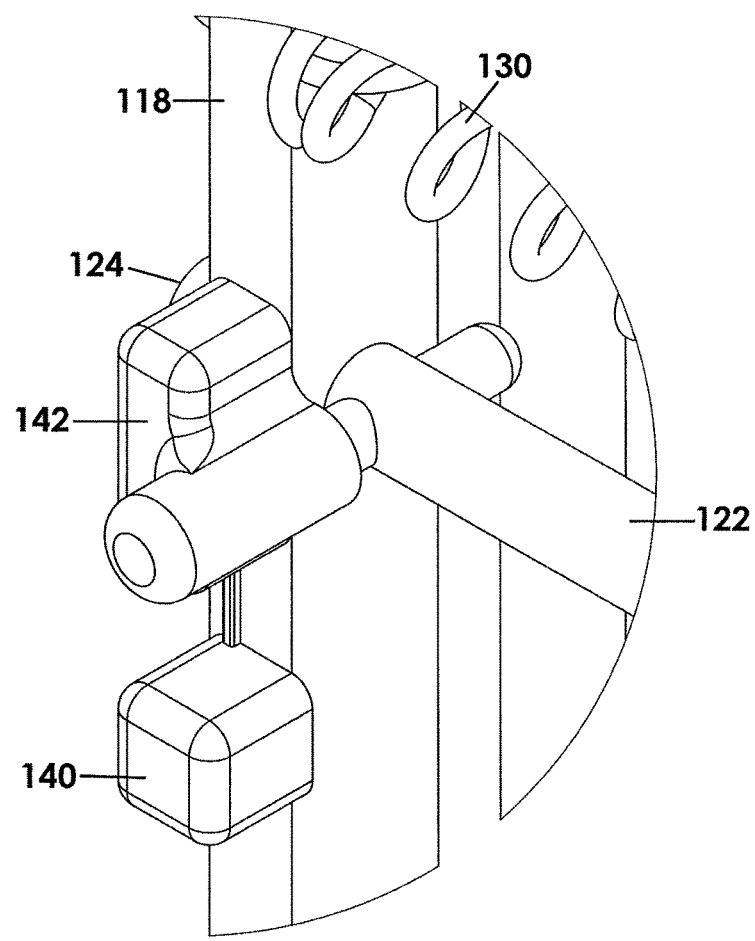
FIG. 27 is an isolated view on an enlarged scale taken from FIG. 25.
Figure 28:
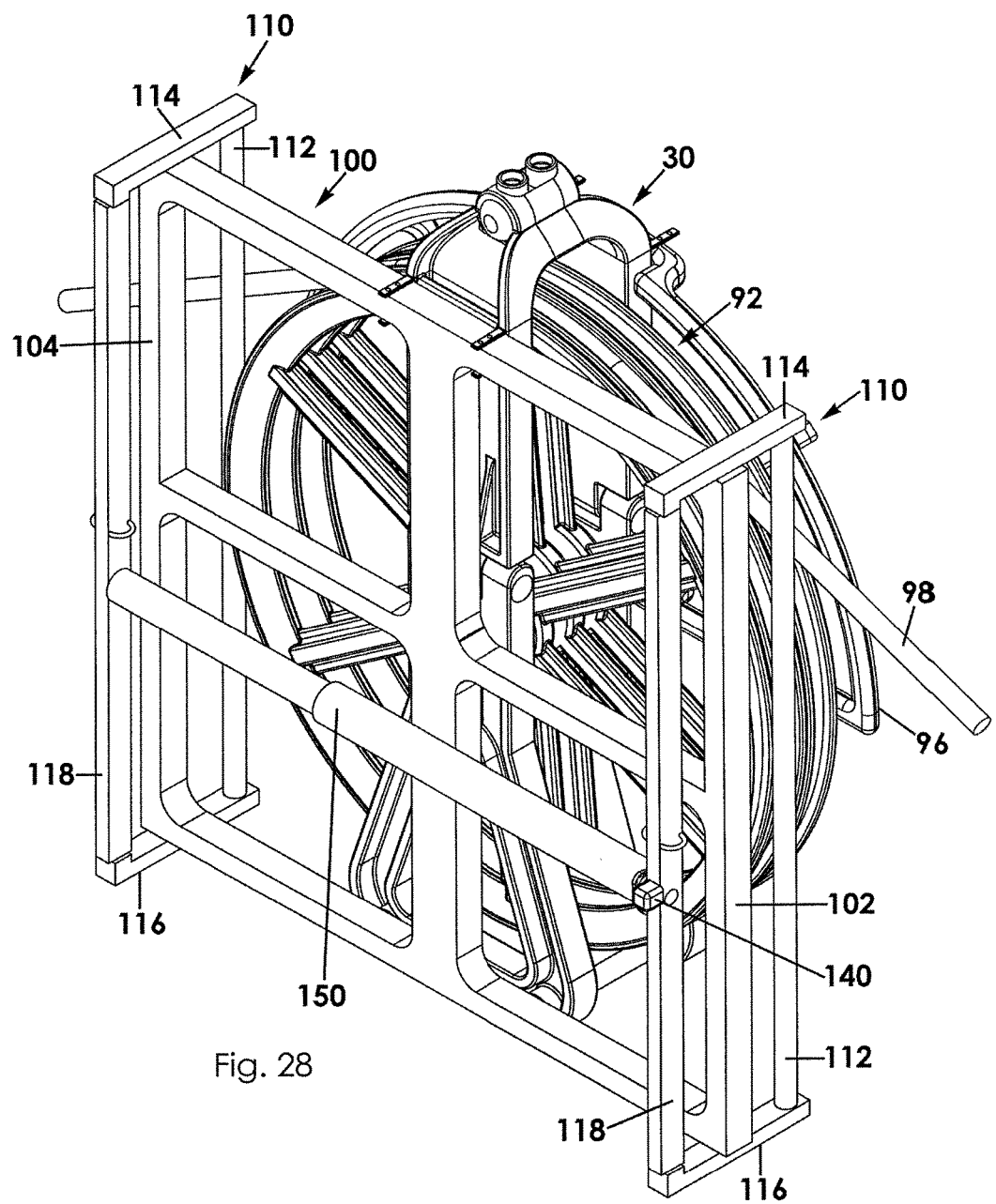
FIG. 28 is a perspective view of a cable guide actuator apparatus according to a another embodiment of the present invention, illustrated with the roller assemblies in a deployed and locked configuration.
Figure 29:
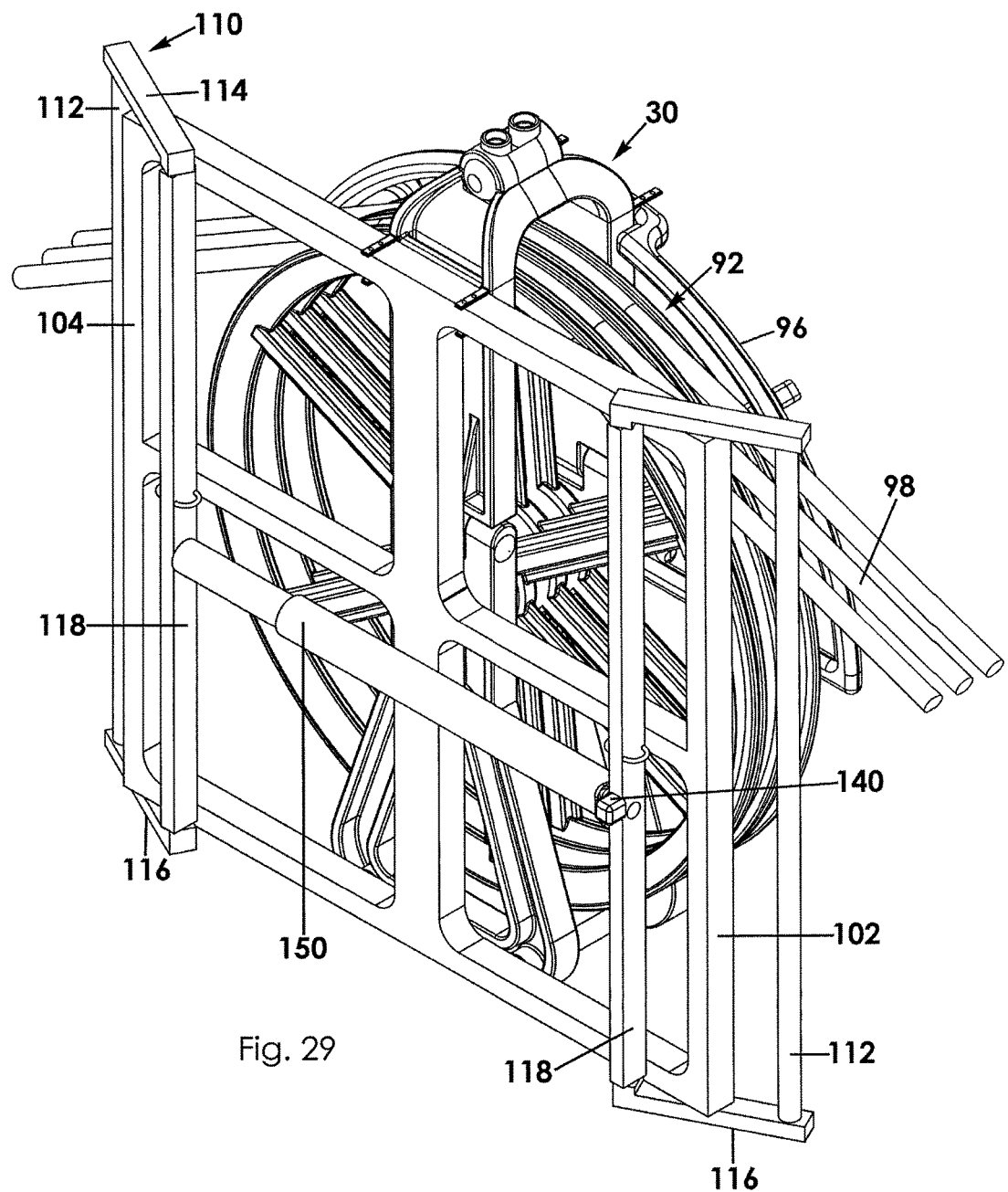
FIG. 29 is another perspective view of the cable guide actuator apparatus as in FIG. 28, illustrated with the roller assemblies in a released configuration.
Figure 30:
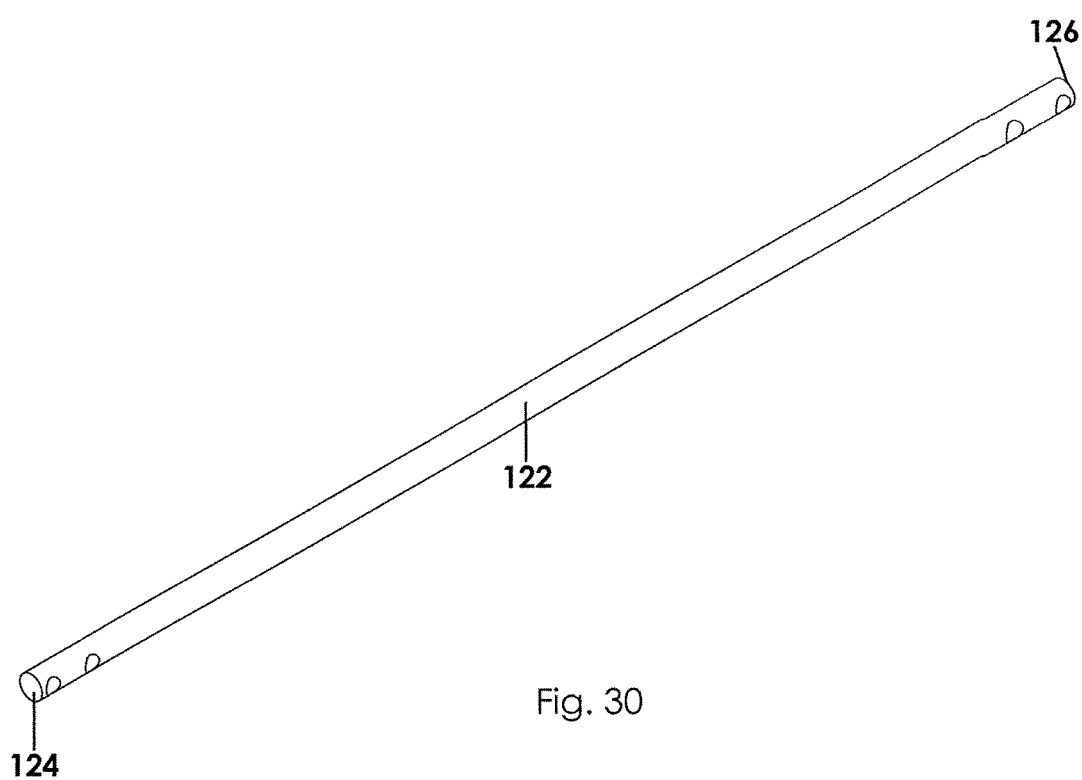
FIG. 30 is a perspective view of a rod separated from the locking assembly of FIG. 16.
Figure 31A:
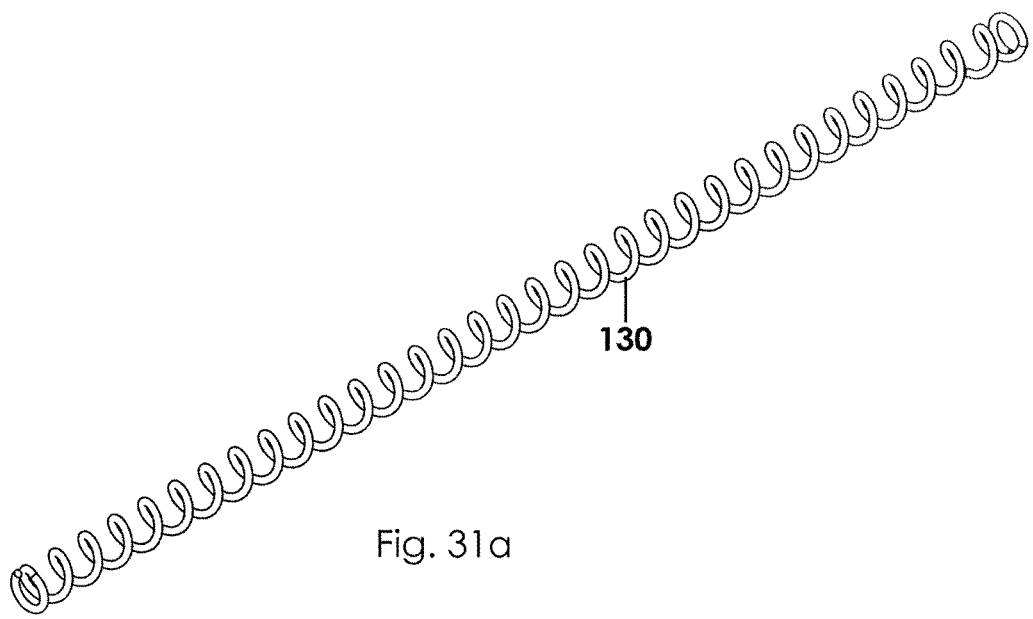
FIG. 31a is a perspective view of a tension spring separated from the locking assembly of FIG. 16, illustrated in an expanded configuration.
Figure 31B:
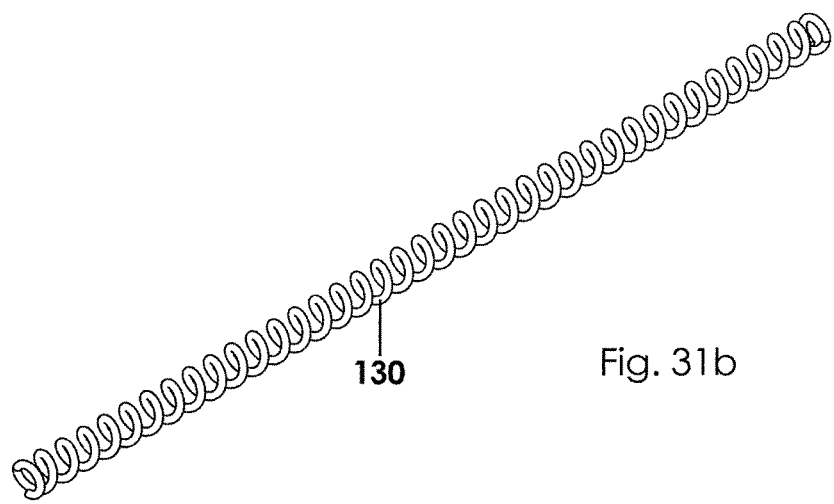
FIG. 31b is another perspective view of the tension spring as in FIG. 31, illustrated in a normally biased and contracted configuration.
Figure 32:
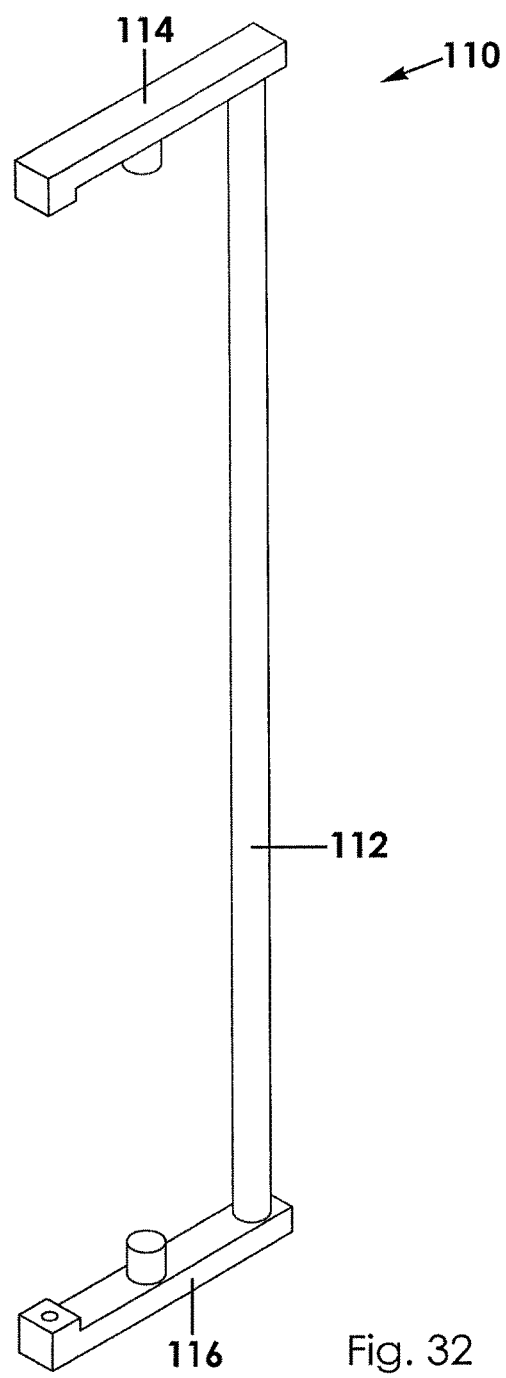
FIG. 32 is a perspective view of a roller assembly removed from the apparatus as in FIG. 16.
Figure 33:
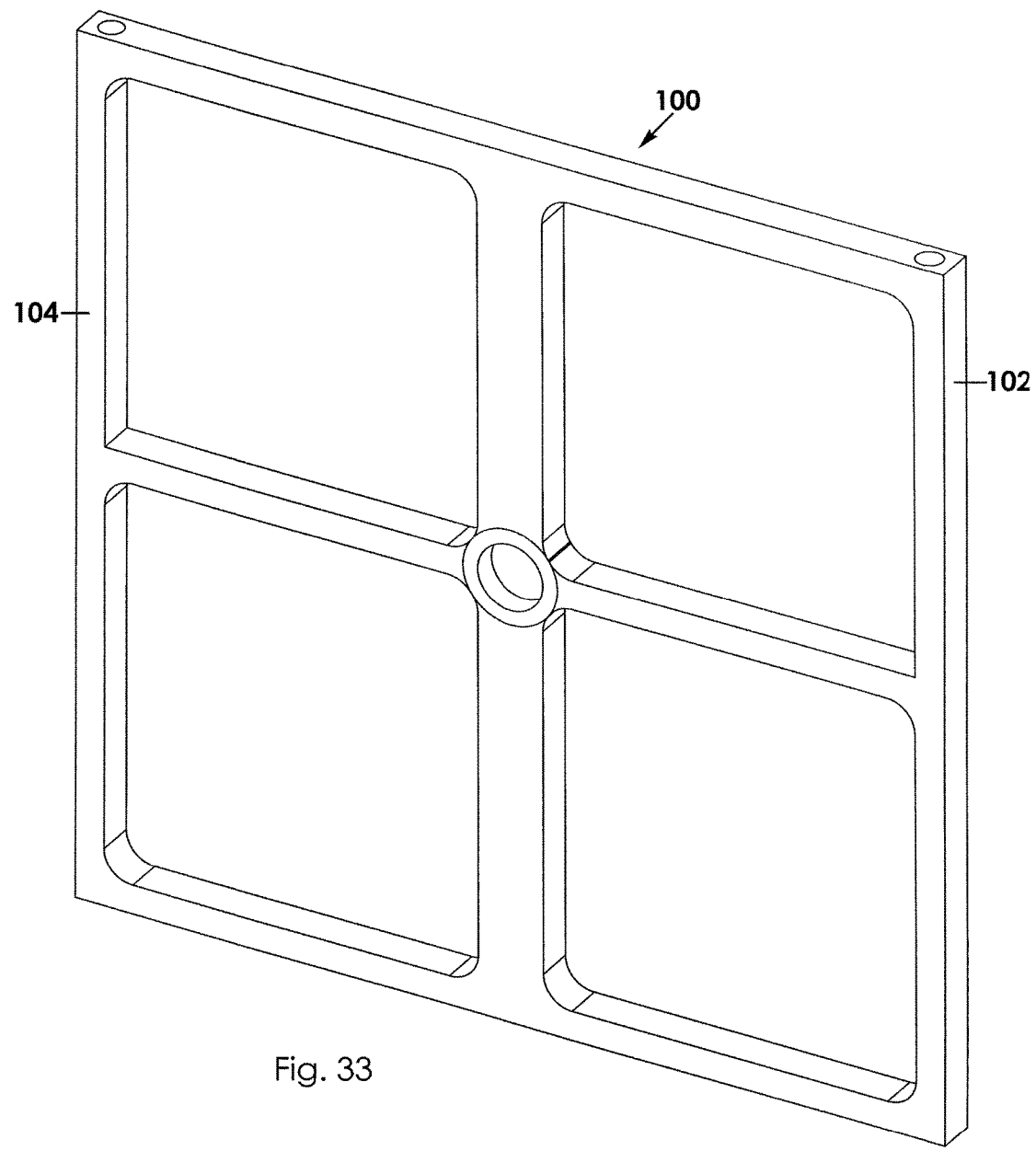
FIG. 33 is a perspective view of the framework removed from the apparatus as in FIG. 16.

In an embodiment, the locking assembly 120 may include a receiver 140 capable of receiving an actuation signal such as a radio or cellular signal (FIGS. 25 to 27). The receiver 140 may be electrically connected to a linear actuator 142 such as one that includes a solenoid or an electromagnet. The actuator 142 may be the fastener 128 coupled an end of the rod 122 to a respective roller assembly 110 or, alternatively, may be operatively coupled to the pin as described above. When the receiver 140 receives a predetermined actuation signal, such as from a user on the ground, the actuator 142 is prompted to release the rod 122 to move to the unlocked configuration which, correspondingly, allows the roller assemblies 110 to move to the released configuration.

In an embodiment, the locking assembly 120 and tension spring 130 may be replaced by a linkage operated by a linear actuation device 130 such as a pneumatic, hydraulic, or electric cylinder. More particularly, the actuation device 130 includes opposed ends coupled to respective rear portions 118 of respective roller assemblies 110. Upon operation of the actuation device 130, the roller assemblies 110 are moved mechanically to the released configuration as described above.

It is understood that while certain forms of this invention have been illustrated and described, it is not limited thereto except insofar as such limitations are included in the following claims and allowable functional equivalents thereof.

The invention claimed is:

1. An cable guide actuator apparatus for guiding a conductor cable into a groove defined by an outer face of a wheel assembly, said cable guide acatuator apparatus comprising:
   a guide assembly that includes a framework operatively coupled to the wheel assembly and having opposed front and rear ends;
   a pair of roller assemblies pivotally coupled to said front and said rear ends of said framework, respectively, each roller assembly having a roller member forming a roller surface capable of maintaining the conductor cable in the groove of the wheel assembly;

wherein said pair of roller assemblies is pivotally movable between a deployed configuration at which said pair of roller members is adjacent said groove and a released configuration at which said pair of roller members is displaced from said groove;

a locking assembly extending between said pair of roller assemblies and selectively movable between a locked configuration that maintains said pair of roller assemblies at said deployed configuration and an unlocked configuration that allows said pair of roller assemblies to move to said released configuration;

means for normally biasing said pair of roller assemblies toward said released configuration when said locking assembly is unlocked;

a remote means for unlocking said locking assembly so that said pair of roller assemblies automatically moves to said released configuration.

2. The cable guide actuator apparatus as in claim 1, wherein said biasing means is a tension spring extending between rear portions of said pair of roller assemblies and configured to pull said rear portions toward one another so as to pivot said roller members away from the groove of the wheel assembly.

3. The cable guide actuator apparatus as in claim 1, wherein:
said locking assembly includes a rod having opposed first and second ends and defining a linear configuration, said first end of said rod being releasably coupled to one of said pair of roller assemblies with a fastener;
said locking assembly is released from said one of said pair of roller assemblies when said fastener is removed from said rod so that said pair of roller assemblies are moved automatically to said released configuration by said biasing means.

4. The cable guide actuator apparatus as in claim 3, wherein said remote means for releasing said locking assembly is a pull cable coupled to said fastener and having an elongate configuration extending away from said rod, whereby said fastener is removable from said rod by a manual pulling of said pull cable by a user.

5. The cable guide actuator apparatus as in claim 4, wherein said fastener is a pin extending through an aperture in said first end of said rod, said pull cable being coupled to said pin and configured to selectively remove said pin from said rod so as to release said rod to slide through said one of said roller assemblies.

6. The cable guide actuator apparatus as in claim 1, wherein: said locking assembly includes a rod having opposed first and second ends and including a linear configuration, said first end of said rod being releasably coupled to one of said pair of roller assemblies with an actuator and said second end of said rod being fixedly coupled to another of said pair of roller assemblies; said locking assembly includes a receiver electrically connected to said actuator and configured to receive an actuation signal, said receiver configured to actuate said actuator upon receiving said actuation signal; said first end of said rod is released from said one of said pair of roller assemblies when said actuator is actuated by said receiver so that said pair of roller assemblies are moved automatically to said released configuration by said biasing means.

7. The cable guide actuator apparatus as in claim 2, wherein said spring includes a first end coupled to a respective rear portion of a respective roller assembly and a second end coupled to another respective rear portion or another respective roller assembly, said spring being configured to pull said respective rear portions toward one another when said locking assembly is released.

8. The cable guide actuator apparatus as in claim 1, wherein:
each roller assembly includes an upper flange extending between upper ends of a respective roller member and a respective rear portion;
each roller assembly includes a lower flange extending between lower ends of said respective roller member and said respective rear portion;
said upper flange and said lower flange are pivotally coupled to a respective end of said framework.

9. The cable guide actuator apparatus as in claim 8, wherein each roller member is rotatably coupled to a forward end of a respective upper flange and configured to rotate when the conductor cable travels thereover.

10. The cable guide actuator apparatus as in claim 1, wherein one of said respective roller members is positioned proximate a downstream edge of the wheel assembly and another one of said respective roller members is positioned proximate an upstream edge of said the wheel assembly, whereby to urge the conductor cable into said groove of said outer face of the wheel assembly.

11. A stringer wheel and cable guide apparatus for use in stringing and tensioning a conductor cable, comprising:
a wheel assembly having a hub and a rim rotatably coupled to said hub, said rim having an outer face defining at least one groove configured to receive the conductor cable;
a guide assembly that includes a framework operatively coupled to the wheel assembly and having opposed front and rear ends;
a pair of roller assemblies pivotally coupled to said front and said rear ends of said framework, respectively, each roller assembly having a roller member forming a roller surface capable of maintaining the conductor cable in the groove of the wheel assembly;
wherein said pair of roller assemblies is pivotally movable between a deployed configuration at which said pair of roller members is adjacent said groove and a released configuration at which said pair of roller members is displaced from said groove;
a locking assembly extending between said pair of roller assemblies and selectively movable between a locked configuration that maintains said pair of roller assemblies at said deployed configuration and an unlocked configuration that allows said pair of roller assemblies to move to said released configuration;
means for normally biasing said pair of roller assemblies toward said released configuration when said locking assembly is unlocked;
a remote means for unlocking said locking assembly so that said pair of roller assemblies automatically moves to said released configuration.

12. The cable guide actuator apparatus as in claim 11, wherein said biasing means is a tension spring having opposed ends coupled to said rear portions of said pair of roller assemblies and configured to pull said rear portions toward one another so as to pivot said roller members away from said at least one groove of said wheel assembly.

13. The cable guide actuator apparatus as in claim 11, wherein:
said locking assembly includes a rod having opposed first and second ends and having a linear configuration, said first end of said rod being releasably coupled to one of said pair of roller assemblies with a fastener;

said locking assembly is released from said one of said pair of roller assemblies when said fastener is removed from said rod such that said pair of roller assemblies are moved automatically to said released configuration by said biasing means.

14. The cable guide actuator apparatus as in claim 13, wherein said remote means for releasing said locking assembly is a pull cable coupled to said fastener and having an elongate configuration extending away from said rod, whereby said fastener is removable from said rod by a manual pulling by a user.

15. The cable guide actuator apparatus as in claim 14, wherein said fastener is a pin extending through an aperture in said first end of said rod, said pull cable being coupled to said pin and configured to selectively removed said pin from said rod so as to release said rod to slide through said one of said roller assemblies.

16. The cable guide actuator apparatus as in claim 11, wherein said outer face of said rim defines a plurality of spaced apart grooves configured to receive a plurality of spaced apart conductor cables.

17. The cable guide actuator apparatus as in claim 11, wherein said outer lace of said rim defines a plurality of spaced apart grooves configured to receive a plurality of cables.

18. The cable guide actuator apparatus as in claim 11, wherein each roller member is rotatably coupled to said framework and configured to rotate when the cable travels thereover.

19. The cable guide actuator apparatus as in claim 11 wherein said mean for biasing said pair of roller assemblies toward said released configuration is one of a pneumatic, electric, or hydraulic actuator.

20. The cable guide actuator apparatus as in claim 19, further comprising a receiver electrically connected to a respective actuator and configured to receive an actuation signal, said receiver configured to actuate said respective actuator upon receiving said actuation signal.

* * * * *